US008187068B2

(12) United States Patent
Slomiany et al.

(10) Patent No.: US 8,187,068 B2
(45) Date of Patent: May 29, 2012

(54) SYSTEM AND METHOD OF AN INTERACTIVE MULTIPLE PARTICIPANT GAME

(75) Inventors: Scott D. Slomiany, Rolling Meadows, IL (US); Lawrence E. DeMar, Winnetka, IL (US); Duncan F. Brown, Grayslake, IL (US); Steven Jay Katz, Vernon Hills, IL (US)

(73) Assignee: Case Venture Management, LLC, Northbrook, IL (US)

( * ) Notice: Subject to any disclaimer, the term of this patent is extended or adjusted under 35 U.S.C. 154(b) by 158 days.

(21) Appl. No.: 12/580,645

(22) Filed: Oct. 16, 2009

(65) Prior Publication Data

US 2010/0035674 A1 Feb. 11, 2010

Related U.S. Application Data

(62) Division of application No. 11/296,840, filed on Dec. 6, 2005, now abandoned.

(60) Provisional application No. 60/633,718, filed on Dec. 6, 2004, provisional application No. 60/726,372, filed on Oct. 13, 2005.

(51) Int. Cl.
*A63F 13/00* (2006.01)

(52) U.S. Cl. ................................. 463/9; 463/16; 463/42

(58) Field of Classification Search ................ 463/9, 16, 463/42
See application file for complete search history.

(56) References Cited

U.S. PATENT DOCUMENTS 4,108,364 A 8/1978 Tanaka et al.
4,718,672 A 1/1988 Okada
5,116,055 A 5/1992 Tracy
5,494,294 A 2/1996 Cappetta
5,788,573 A * 8/1998 Baerlocher et al. ............. 463/16
5,791,988 A * 8/1998 Nomi .............................. 463/11
5,921,864 A * 7/1999 Walker et al. ..................... 463/9
6,017,032 A 1/2000 Grippo et al.
6,059,289 A 5/2000 Vancura
6,077,162 A 6/2000 Weiss (Continued)

FOREIGN PATENT DOCUMENTS

WO WO 2006/063054 A2 6/2006

OTHER PUBLICATIONS

Slomiany et al., U.S. Appl. No. 60/726,372, filed Oct. 13, 2005.

(Continued)

*Primary Examiner* — James S McClellan

(74) *Attorney, Agent, or Firm* — McDonnell Boehnen Hulbert & Berghoff LLP

(57) ABSTRACT

A plurality of linked gaming machines are disclosed that enhance the community participation and enjoyment of a game on multiple gaming machines. Players participate in an interactive game, either simultaneously, alternatively or in a systematic sequence, as a group or community. The participating players compete in the game such that the actions and results of each player affect the other players in the community. The interactive game combines skill and luck to improve play of the game. The interactive game could be a bonus game which players need to qualify in order to participate. If a player does not qualify, a wager can be placed to participate in the game. Players with different wagers can participate in the same game and players can wager on the outcomes of other players.

22 Claims, 14 Drawing Sheets

U.S. PATENT DOCUMENTS

| | | | | |
|---|---|---|---|---|
| 6,146,273 | A | 11/2000 | Olsen | |
| 6,162,121 | A * | 12/2000 | Morro et al. | 463/16 |
| 6,394,899 | B1 * | 5/2002 | Walker | 463/9 |
| 6,416,408 | B2 | 7/2002 | Tracy et al. | |
| 6,503,146 | B2 | 1/2003 | Walker et al. | |
| 6,514,144 | B2 | 2/2003 | Riendeau et al. | |
| 6,575,829 | B2 | 6/2003 | Coleman et al. | |
| 6,648,753 | B1 | 11/2003 | Tracy et al. | |
| 6,692,354 | B2 | 2/2004 | Tracy et al. | |
| 2001/0004606 | A1 | 6/2001 | Tracy et al. | |
| 2002/0107062 | A1 * | 8/2002 | Wong | 463/9 |
| 2002/0151342 | A1 | 10/2002 | Tracy et al. | |
| 2003/0104855 | A1 | 6/2003 | McClintic | |
| 2004/0121838 | A1 * | 6/2004 | Hughs-Baird et al. | 463/25 |
| 2005/0176494 | A1 * | 8/2005 | Thomas | 463/25 |
| 2006/0121971 | A1 | 6/2006 | Slomiany et al. | |

OTHER PUBLICATIONS

Slomiany et al., U.S. Appl. No. 60/633,718, filed Dec. 6, 2004.

* cited by examiner

SYSTEM AND METHOD OF AN INTERACTIVE MULTIPLE PARTICIPANT GAME

This application is a divisional of application Ser. No. 11/296,840 filed Dec. 6, 2005, which claims the benefit of U.S. Provisional Application No. 60/633,718 filed Dec. 6, 2004 and U.S. Provisional Application No. 60/726,372 filed Oct. 13, 2005.

FIELD OF THE INVENTION

This invention relates to games in general, and particularly to gaming machines allowing wagers to be placed on a game, and more particularly to a plurality of gaming machines networked together for interactive play by a community of multiple players.

BACKGROUND OF THE INVENTION

Wagering games, like those in a casino environment, for example table games and slot machines, are typically each played individually by a single player who makes a wager and collects or loses coins, or credits and the like, based upon the outcome of the game played. The outcome is ordinarily independent of the result of any other player or slot machine in the casino.

Table games are well known wagering games (e.g., blackjack, craps, roulette) generally played by multiple players who sit around a physical table and make wagers on potential outcomes of a game prior to the play of the game. In some variations, the players participate in the play of the game while in other variations, the players watch the game being played, but in all such variations, each player collects or loses based on the outcome of the game as it relates to his or her own participation. In table games, generally a player makes a wager, the game is played (such as by a casino employee called the dealer or in some cases by a computer) following which the result of the game is evaluated, and payment is made to the players based on the outcome of the game. In some table games, such as roulette and keno, the player's involvement is limited to placing a bet and watching the outcome on a wheel or board. All players win or lose independent of the result for any other player.

In other table games, such as blackjack and Pai-gow poker, the player makes one or more decisions during the course of the game (such as drawing or grouping cards) and the outcome is determined by evaluating the hand of the player against the hand of the dealer. Again, all players win or lose independent of the result for any other player.

In still other table games, such as five-card draw poker and Texas-hold 'em, players play each game against other players at the table by making wagers into a common prize pot, with a single player winning the game and collecting the prize pot while all other players lose and are excluded from collecting any portion of the prize pot at the end of the game. In this type of game, the players win or lose money from each other. In a casino environment, the operator or casino takes a fixed percentage of the prize pot without any risk of loss, regardless of the skill of each player. Players enjoy playing table games in a group setting, whether competing against the house or each other.

Players participating in table games play as a community, and the group participation is a feature upon which players choose to play table games, versus the solitary play of slot machines. Although some table games, such as roulette, blackjack and certain poker games can be played by a single player against the dealer, most players typically prefer to play table games with multiple players participating in the game. Table game players share their experience with, and evaluate the result of their play, against other players at the same table. This community play aspect is a desirable feature of table games for some players.

Yet gaming machines, such as slot machines, poker machines, blackjack machines, are sometimes more desirable to a player than a table game. Gaming machines are well known in the art and typically use spinning mechanical reels or a video display to display the results of game. These machines minimally contain a player input device, for example, mechanical buttons, a handle or a touchscreen monitor. Players wager money on plays of the game, often registered as credits on the machine. Each machine registers the money wagered by the player, whether it is through the insertion of coins or bills, voucher tickets, credit cards or electronic funds transfer. Each machine offers the player a means to cash out, whether by dispensing coins from a hopper, dispensing bills, printing a voucher ticket, applying credit to a credit card or other electronic funds transfer.

Traditional slot machines have a plurality of rotating mechanical drums, or reels, which rotate and then stop to show symbols on one or more paylines drawn across the reels. These may be actual mechanical reels, or more often a computer simulation on a video display. Players wager coins, or credits, on one or more of these paylines, actuate spins and receive a payment for certain combinations of symbols on a payline for which a wager has been placed. More recent video slot machines offer these same types of features and often add in a bonus game that occurs when a game results in a particular symbol combination. In many such cases, the outcome and play of the game is solitary to the player making the wager. In most cases, there are no skillful choices made by the player to affect long term results.

As noted above, a bonus game is offered on many slot machines. The bonus game is usually actuated for play at random times, as by certain combinations resulting from the wagered play of the game, such as the occurrence of a certain pattern of symbols on the paylines wagered upon by the player on the slot machine, for example, a row of "bonus game" symbols appearing upon a wagered payline. The bonus game, once actuated, generally consists of a separate game played on the display of a slot machine. For example, a player selects objects from a choice of objects offered, and receives coins or credits based upon the value of the objects revealed after the game is played. In other bonus games, an event is displayed for the player's amusement, and the player receives coins or credits based on the outcome of the event.

Some players enjoy playing in groups. Gaming machines are frequently arranged within a casino in groupings of like games, such as areas for video poker machines or in banks of games with the same or similar titles, themes or brands. During their individual play, players often enjoy social interchange with players on nearby machines, witness and comment upon outcomes achieved by other players, and evaluate their results against what other players achieve.

To enhance the social aspect of gaming machines that the players find desirable, casinos frequently arrange contests where players play against one another. One contest, known as a slot tournament, generally involves play by each participant at his own slot machine over an allotted period of time, for example five to fifteen minutes, or using a fixed number of credits. The players may play one at a time or preferably simultaneously with other players in the tournament. The winner of the contest is selected by the determination of which player has scored the largest amount won during the tournament period.

Slot machine tournaments require a substantial effort by the location, frequently involving time consuming movement of slot machines to create a contest area, and reprogramming of slot machines, which may include changes to the machine hardware by replacing computer chip sets, to set up the machines for the tournament. Additionally, the movement and reprogramming of the slot machines by the casino may require governmental regulatory supervision, frequently involving a physical inspection of the machines by the regulator prior to the tournament. Play in tournaments must be hosted by the location to seat players at the machines, monitor play during the tournament, and determine the winner. Locations expend substantial resources to create slot tournaments because slot machine players enjoy these multi-participant events, which differ from normal individual slot machine play by offering increased social and community involvement amongst the participant players.

These gaming machines may not necessarily function totally independently. In certain desired instances they can be interconnected, such as through a LAN in a local environment, or a wide area network (private) or the Internet in a more global application, so that multiple players can participate at the same time.

Participation may be in the form of a display which shows game information, including any bonus game information, drawn from a plurality of gaming machines linked to a centralized display. Both U.S. patent application Ser. No. 09/844,082 to Gomez and European Patent EP 0 981 119 A2 to DeMar discuss a linked plurality of gaming machines with a centralized display to allow greater visibility of the bonus game from individual gaming machines.

Gaming machine players enjoy opportunities to play games as a community on a regular basis. A variety of community bonus games have been suggested. The following discusses some of these.

U.S. Pat. Nos. 5,779,544, 5,976,015, and 5,997,400, all to Seelig, disclose a race game played on individual gaming machines. The progress of each player is illustrated either on the individual machine or on a common display. U.S. Pat. Nos. 5,779,544, 5,976,015, and 5,997,400 to Seelig describe a plurality of slot machines combined with an overhead racing display which carries a number of racing elements. The Seelig patents describe a game with an associated racing element assigned to each player upon initiation of the game. Each time a player wins at the game being played, or each time the slot machine handle is pulled, or each time a coin is played on one of the slot machines, the player's racing element is moved a predetermined distance.

U.S. Pat. No. 6,793,575 to Brown describes a race game played simultaneously by multiple players. A player selects a racecar in one embodiment and inputs a wager. The wager requires an input by the player as to the number of races desired to be completed up to a preset maximum. Thus, the player can choose to bet upon all stages (races or laps). Each racecar is randomly assigned a finishing position upon initiation of the first race. The player has no control over the finishing position.

There are linked gaming machines where multiple players play a base game to achieve a bonus game. The "Super Spin Wheel of Fortune" game allows multiple players to play linked slot machines for a chance to spin the giant wheel in the center of the linked gaming machines. Multiple players that reach the bonus game, within a specified time period, may participate jointly in spins of the bonus wheel. Each spin of the bonus wheel is independent from one another.

There are linked slot machines configured to give periodic bonuses to players playing on the plurality of linked gaming machines, for example, the linked slot machines of "Moneytime" provided by Mikohn or "Hurricane Zone" by Acres. There are also linked gaming machines configured for multiple players to play a base game for a growing, or progressive jackpot. There are also linked gaming machines configured for multiple players to play a base game for a chance to achieve play of a bonus game. The bonus game is played individually on the player's gaming machine to try to win a portion of the progressive jackpot. Examples of such progressive jackpot games include the "Cash Express," "Millioniser" and "Mr. Cashman" by Aristocrat, "Fort Knox" and "Party Time" by IGT and "Jackpot Party" by WMS Gaming.

U.S. Pat. No. 6,315,660 to DeMar discusses gaming machines with bonus games that allow the player to wager additional credits to enhance the value of the bonus game. The more a player wagers, the more credits awarded for a winning combination.

There have been gaming machines where skillful choices improve long term results; however, in most cases this has been available in a design where perfect "skill" gives the maximum award set by the operator and a lack of skill reduces the award. Examples of gaming machines of this form include video draw poker as well as slot machines including Yahtzee, Battleship, Trivial Pursuit and Ripley's Believe It or Not.

The video poker game "Flush Attack" by Sigma, allows a plurality of gaming machines to enter a special mode where the next winning hand, or flush, on any machine is paid a bonus award.

The popularity of the games, and these gaming machines, derives from a number of factors, some of which are the apparent likelihood of winning (typically money in a wagering environment), the attractiveness of the gaming machine, and the basic level of entertainment provided by the game/gaming machine itself. It is therefore one general driving force in the gaming industry to come up with new and exciting games and gaming machines that will attract players, entertain them, and promote repeated play.

One way that has been tried to accomplish the foregoing has been to enhance the play of a base game, where the base game may be a relatively standard-type game already established in the industry, with a bonus game. Such a bonus game can be one which is similar to the underlying game being played, or can be completely unrelated to the base game in the sense of being a game different from that being played as the base game. For instance, the bonus game could be a separate wheel that is spun in the course of play of a slots game when triggered by some event in the slots game.

Players would enjoy opportunities to play otherwise solitary games as a community with other players, differing from individual slot machine play. Multiple linked wagering devices with interactive play would offer increased social and community involvement amongst the participant players. The addition of skill to a community bonus game can be a great enhancement to playing in solitude on an individual machine. The purpose of the present invention is to create features that enhance the community participation and enjoyment of a shared game on multiple machines.

SUMMARY OF THE INVENTION

The addition of a community bonus game can be a great enhancement to playing in solitude on an individual machine. It is a principal objective of the present invention to create features that enhance the community participation and enjoyment of a shared game on multiple gaming machines. While there have been games where players participated in bonus games at the same time, there has not been (until the present invention) a group or community bonus game wherein the participating players compete in the game such that the actions and results of each player affects the other players in the community. The game is thus interactive. Each player can be two or more people, one person with two or more inputs, a person and a machine, etc.

The present invention satisfies the need for a group, or community, bonus game where the players interactively take turns playing the bonus game. One player's gain is at the expense of another player in the group play for a pool of bonus money. Thus, good choices by one player improve his or her outcome at the expense of other players and bad choices improve the other players' outcome.

The present invention, in perhaps one of its broadest expressions, comprises a plurality of electronically linked gaming machines upon which a base game and a bonus game are playable. A wager is placed by a player to play the base game. A controller engages at least one of the linked gaming machines to interactively play a bonus game with at least two participants. A player interface mechanism provides input from each player participating in the bonus game. The input provided by each player affects the interactive play of the bonus game for all participating players. Upon a bonus game conclusion, a payout is calculated, if any, for each participating player. An additional object is that the at least two participants are humans.

In one preferred form, the present invention is a method for operating a community bonus game on a plurality of gaming machines linked by a central computer. A player enters a wager and a base game is played. The base game provides participation in a community bonus game, which is initiated under a predefined circumstance. The community bonus game is executed and the plurality of gaming machines interactively participate in the community bonus game. The interactivity of each participant can independently affect an outcome in the community bonus game. An award, based at least in part on the outcome in the community bonus game is presented to the players.

In another preferred form, the present invention is a method for operating an interactive game on a plurality of linked gaming machines. The interactive game has a first set of a plurality of game elements that yield letters comprising at least one word that is hidden from view from the players. A wager is entered and at least two players alternately play the interactive game. The players select one game element from a second set of a plurality of game elements. The second set of game elements are letters known to the player before the player selects a letter that may be revealed in the first set of game elements. The first set of game elements reveal at least one word. After an award is calculated based on the game element letters revealed in the first set of game elements, the award is presented to at least one player playing the game.

In yet another preferred form, the present invention is a system for operating a plurality of electronically linked gaming stations by a first player and a second player participating on separate gaming stations. A wager is registered for each player to play an interactive game including a plurality of scoring conditions. A mechanism registers each player's input in the course of play of the interactive game to compete for an award. An allocation of the scoring conditions to a respective player is affected by each player's input and the award at the conclusion of the game is based at least in part upon the allocation.

In yet another preferred form, the present invention is a system for operating a plurality of electronically linked gaming machines with a wager input mechanism. A base game is playable on each linked gaming machine and a bonus game is interactively playable on each linked gaming machine. At least two players qualify to play the bonus game. The qualification of each player may occur at different times and the bonus game only commences when at least one qualification has occurred. A controller operatively engages at least one linked gaming machine to interactively play the bonus game. A player interface mechanism provides input from each player participating in the interactive play and a payout is calculated, if any, for each participating player.

In yet another preferred form, the present invention is a method for operating a community bonus game wherein a wager is entered. A plurality of gaming machines are electronically linked to a central computer. The base game is played and also provides participation in a community bonus game. The community bonus game is executed with the gaming machines participating interactively to a community bonus game outcome. An award is presented based at least in part on the outcome in the community bonus game. The award includes a bonus game pot that is redistributed based on the amount of the wagers and the outcome in the community bonus game.

In yet another preferred form, the present invention is a system for operating a plurality of electronically linked gaming machines comprising a wager input mechanism. A base game is playable on each linked gaming machine along with a bonus game that is interactively playable on each linked gaming machine with at least two players. A player interface mechanism provides input from each player participating in the interactive play of the bonus game and the input by each participating player requires skill that affects the interactive play of all the participating players of the bonus game. A payout is calculated, if any, for each participating player.

It is accordingly a principal objective of the present invention to provide a new game in the form of a bonus game, which in a presently preferred form is particularly adapted as a bonus game for a gaming machine such as wagering machines (slot machines) in a wagering environment, as in a casino or Internet setting. In a casino environment, it could be applied to a spinning reel slot machine, or a video slot machine, a video card game machine, or any other game of chance, for that matter.

Again, although the invention will be primarily described hereafter as a bonus game associated with a video gaming machine, it could readily be adapted for a live casino game at a gaming table, for instance, where the bonus game could be displayed on a video monitor as an adjunct to the gaming table. It furthermore need not be limited to a bonus game, since the interactive nature between linked machines is considered unique unto itself.

In accordance with the foregoing principal objective, the invention takes the form in one aspect as a method of playing a bonus game associated with a plurality, or cluster, of networked gaming machines. The gaming machine has a base game, which can be of any known (or hitherto unknown) type. Players qualify for the bonus game independently of other players. The bonus game commences randomly at a later time. It is also contemplated that the bonus game can be selected for operation (play) if a predetermined event occurs in the base game.

If a player does not qualify for the bonus game before the bonus game starts, the player has the option to "buy" the right to play in the bonus game, which essentially provides the player a chance to win at the bonus game. Otherwise, a player can add a wager on a potential winning combination of another player's outcome, for example, wagering on another player's horse.

The base game is returned to upon conclusion of the bonus game. In a preferred form of the invention, the bonus game includes a plurality of networked gaming machines wherein multiple players participate in the bonus game as a community.

A plurality of networked gaming machines can be configured to operate together, or in conjunction, such that the bonus game is played by two or more players, each player playing at their own respective gaming machines.

In one preferred variation, the invention is a slot machine wagering game that has a community bonus game that some or all of the players at the same cluster of networked gaming machines may participate, either by chance, skill or by making an additional wager on the bonus game.

One object of the present invention is to provide a bonus game that is interactive. The decisions and actions made by each player affect the bonus game in progress, in turn, affecting the other players that are playing the bonus game ultimately affecting the outcome of the bonus game.

Another object of the present invention is to provide a bonus game with multiple players participating, where each player takes a turn, either alternately or in a systematic sequence, to play out the bonus game.

Another object of the present invention is to provide a bonus game with a shared bonus pool among the bonus game participants. The players compete for the shared bonus pool during the bonus game causing at least one player's gain to be at the expense of at least another player. The bonus pool is a known percentage of the payback, but distributed among the participating players as a result of his or her skill and luck in the bonus round. The house, or casino, is unaffected by a player's skill.

Yet another object of the present invention is to provide a bonus game wherein each player involved uses skill to improve play of the bonus game. The player's skill enables the player to win more than if playing without skill. This allows the player with a better combination of skill and luck to win additional money at the expense of other competing players, without risk to the casino or operator. This is similar to the situation in a typical casino live poker room.

In one embodiment of the invention, a player will be allowed to wager money or credits in order to participate in the bonus game of one or more other players in the cluster of networked gaming machines.

In another embodiment, multiple players will play in the community bonus game, with the bonus game commencing once all players collectively have amassed a predetermined number of qualifying events (or entires) for operation, or play, of the bonus game.

In another embodiment, players may earn "an entry" to participate in the community bonus game. The player may wait for the bonus game to commence or may cash out a value associated with the bonus game entry.

Another aspect of the invention includes a method that allows players wagering different number of coins/credits or even different denominations (or both) to participate in the same bonus game. The coins or credits are assigned different values based on the base game wager to allow players with different sized wagers to make wagers in the community bonus game.

Another aspect of the invention contemplates additional wagers placed on the community bonus game by any or all of the multiple players playing the plurality of networked gaming machines. The additional wagers are placed prior to participation in the community bonus game.

A bonus game has a known long-term expected value and expected frequency (based on the requirements to qualify) and the base game is designed such that when all possible pays and frequencies are considered that the game returns a specific percentage of money wagered in the long run. Methods for constructing the return of a game using pay amounts and frequency is well known in the art.

As in live poker games, the game operator will net a percentage of the total amount wagered, or handle. The skill and luck in the bonus game will change the distribution of the award among the participating players in certain applications of the invention; for example, the extra money won through skillful play by one player results in less money won by another player. While in live poker games the operator has no risk, the operator carries the short term risk inherent in any slot machine, which is the risk of lucky players getting more than the mathematically expected number of jackpots (or bonus games) or higher than average wins from these events.

In view of the foregoing, for example, a Max Bet could be required at the gaming machine to qualify for the bonus game, so there does not need to be any adjustment of the awards won by the different players. There would also not need to be an adjustment if a fixed side bet were required to qualify for the bonus. However, in another embodiment, a player qualifies for the bonus game with a certain symbol combination on any payline of a multi-line game with any number of credits bet per line. This is a very common bonus qualifying mode in the current state of the art. In this case, the amount won by each player in the bonus game is multiplied by their individual "bet per line" to arrive at the total number of credits earned in the bonus game.

It will of course be understood that the aspects and objectives of the invention are various, and need not be all present in any given embodiment of the invention. The features, advantages and accomplishments of the invention will be further appreciated and understood upon consideration of the following detailed description of an embodiment of the invention, taken in conjunction with the drawings, in which:

DETAILED DESCRIPTION OF EMBODIMENTS OF THE INVENTION

The embodiments of the present invention described hereinafter have been particularly adapted for play on a video display, and even more particularly, for play upon a video gaming machine in a casino environment. The game could easily be adapted for play on a mechanical machine without departing from the invention, or adapted to any other conceivable environment where wagering games are played.

The present invention in the illustrative environment electronically links individual gaming machines via a network. By linking the gaming machines in a common network, the player on the individual gaming machines can participate in a community bonus game. Regardless of the type of gaming machine or its particular configuration for registering wagers, this embodiment contemplates a group of gaming machines configured to operate together to allow a bonus game that is shared by two or more players playing at their own machine. Alternatively, multiple players could take turns on a shared gaming machine. These machines may be individual gaming machines, separate displays on a larger gaming machine or separate controls on a gaming machine using a shared display. For example, it is possible to construct the present invention using a single computer system which would operate each gaming machine and an optional bonus apparatus; however, it is preferred that each gaming machine have its own CPU. Whether configured with a single CPU, or multiple CPUs using a computer network and whether it is a single physical machine or multiple machines, players will each play the game at a gaming machine station which will be referred to as "Gaming Machine" throughout. For each embodiment of this invention, a plurality of gaming machines is connected through a computer network, or software is provided for a single machine to work in a similar mode of operation. The computer network connects each of the gaming machines, as well as any optional bonus apparatus.

Figure 1:
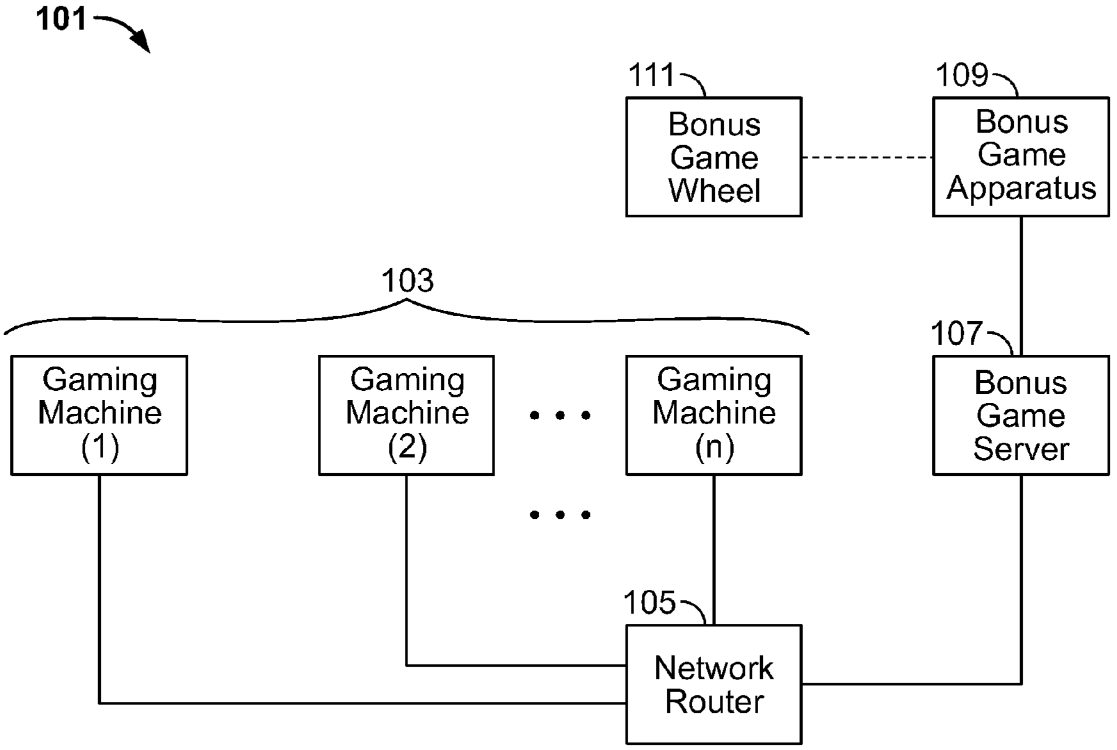
FIG. 1 is a schematic diagram of certain components of a network used in accordance with the present invention.

FIG. 1 schematically illustrates the principal components of the system according to one configuration of the gaming machine network for the present invention. The network 101 includes a plurality of gaming machines 103, or gaming stations. Each gaming machine 103 is networked (e.g., connected) to the bonus game server 107. The gaming machines 103 may be of similar theme or completely different themes. Furthermore, they may be of the same style machine or varied style machine, for example video slot machine, video poker machine, or mechanical reel slot machine.

Each gaming machine 103 is networked to the bonus game server 107 through a network router 105. Computer networking technology is well known in the art and any appropriate networking architecture may be used, such as, but not limited to, Cat-5 Ethernet, Fiber Optic, RS-232, RS-422, 802.11a/big Wi-Fi. The computers could also be networked over a larger network, such as the Internet, using any suitable connection method such as dial-up, DSL, Cable Modem, T1, wireless or other available technology.

Also connected to the network 101 is a computer that serves as the bonus game server 107. A PC such as those made by IBM, Dell, Compaq or HP could be used for the bonus game server 107 as well as a separate gaming machine unit or other embedded computer system. The CPU in the bonus game server 107 controls the operation of the community bonus game as well as controlling the display on the bonus game apparatus 109. In one embodiment, the bonus game apparatus 109 is a large plasma video display, which is easily viewable by each player from his or her individual gaming machine 103. The bonus game apparatus 109 may further include a bonus wheel device 111 for certain embodiments of the present invention. Other types of displays may be used without departing from the invention; for example, the community bonus game may also operate using the local displays on the participating gaming machines 103 with no special bonus apparatus 109 visible to the players.

The computers in this network 101 may be configured to allow one of the gaming machines 103 on the network 101 to become the "master" of the operation of the bonus game. The "master" could be one of the gaming machines 103, the bonus game apparatus 109, or a separate server that handles the bonus games 107. Without departing from the invention, it is further contemplated that each gaming machine 103 could communicate over the network 101 without a bonus game server 107.

A base or primary game is played on each gaming machine 103 in the network 101. The base game could be a multi-line video slot, a spinning reel slot, blackjack, poker, craps, checkers, or any other game. Upon play of a base game, a bonus game can be achieved. The bonus game could also be configured as some variation on the base game itself. For instance, the bonus, or secondary game could be the base game where players now wager credits specifically to play what is then a community game as the base game. This community game aspect could then supplement what was theretofore singular play, or could be a secondary operation of the base game, reverting to the base game proper after play of its secondary aspect.

The community bonus game is configured to allow any number of players to play at one time, i.e., any number of players as deemed advantageous by the game designer. Any method is contemplated to qualify players at the gaming machines for the bonus game, for example, players play a base game that has a symbol combination that qualifies them for the bonus game. When a game played results in a bonus game symbol combination then that player's gaming machine sends a message through the computer network 101 to the bonus game server 107, which registers this player for a bonus game. If a bonus game is in progress, then this request is queued for a future bonus game. A message is sent to the gaming machine 103 causing it to display a text message and to continue regular game play. Otherwise, the bonus game server 107 determines whether a bonus game should begin.

As an example, the bonus game server 107 begins a bonus game when three qualifications are received. It is not necessary for these qualifications to come from an individual gaming machine 103. If one player qualifies more than once then that player will have multiple opportunities to receive awards in the bonus game. As an alternate embodiment, the bonus game could begin anytime a single player has qualified a second time, even if there is not a third qualification received. For example, when a first player qualifies twice without any other player qualifying, then the first player plays two positions. It is contemplated that the computer can play the bonus game, either acting randomly or based on some well-understood algorithm. The purpose of starting the bonus game early when a player qualifies twice is to make it attractive for a person to play alone on the plurality of networked gaming machines. With many people playing on the plurality of gaming machines, bonus games will start often. With one player playing, the bonus game would only start with three qualifications by that player, for example. This feature allows a single player (or low number of players) to get to the bonus game in a faster time, and also provides an opponent (the computer) for the pool of bonus credits available in the game.

Returning to the player that qualified for a bonus game that is not yet ready to begin, the bonus game server 107 sends a message back to the gaming machine 103 to confirm the bonus game registration and indicate that the bonus game is not ready to begin. The gaming machine displays a message indicating that the player is registered for the next bonus game and then resumes normal operation of the gaming machine. The player may now continue normal play at the gaming machine in hopes of qualifying another spot or winning other awards. Should the player run out of money or wish to cash out before the bonus game begins, then the player could collect the expected value of the bonus game, in a variation further described below. The gaming machine could also allow a player to play a bonus game on the local gaming machine or even on the bonus game display of the bonus game apparatus 109, while cashing out a community bonus game that has not yet started, but for which the player has qualified.

Once the bonus game server 107 has received the required registrations of qualified players, it then initiates a bonus game. The bonus game server 107 sends messages to each gaming machine 103 that has registered one or more player qualifications indicating that the bonus game is beginning. Each of these gaming machines 103 sends a message back to the bonus game server 107 acknowledging the bonus game start indicator. Each gaming machine 103 registered for the bonus game completes the current game in progress, and then sends a message to the bonus game server 107 that it is ready to begin the bonus game. In one alternative, the registered gaming machines could suspend any game in progress and start the bonus game immediately without departing from the invention.

As described above, the network shown in FIG. 1 is only one possible configuration of many types of networking hardware and hierarchical arrangements. The gaming machines may be networked in any reasonable method that is available by current technology. Likewise, the messages may be sent using any acceptable protocol and format. The specific messages and timing in this embodiment is but one example of a method to synchronize the bonus game server 107 and the gaming machines 103.

Once each registered gaming machine has finished its game in progress or suspended the current base game state, the gaming machine will show a text message on the display notifying the player to "stand by" for the imminent bonus game. Once the bonus game server 107 has received the ready message from all registered gaming machines 103, or after a reasonable timeout period, the community bonus game begins. In the event a gaming machine 103 loses its connection to the network 101, thus timing out, the player could be offered cashout options, or the gaming machine 103 could re-register the qualified player upon re-establishing the network connection. Any players lost due to a network timeout would be replaced by computer players to allow the credits of the disconnected player to be retained by the gaming machine for later distribution.

The bonus game server 107 sends messages to each gaming machine, which assign a "player number" and other general information about the bonus game such as the current score for each player, the current status of the bonus game, and which player has the current turn. The bonus game server 107 could then play sound or music out of speakers included in the bonus game apparatus 109 (such as connected to the bonus wheel device 111). This sound would not only serve to get the attention of the registered players, but to other players and onlookers alike who may want to watch the bonus game too. Other methods to get attention may be used, such as, but not limited to animations on the bonus game display, special lights, search lights, mirror balls or police lights.

Figure 2:
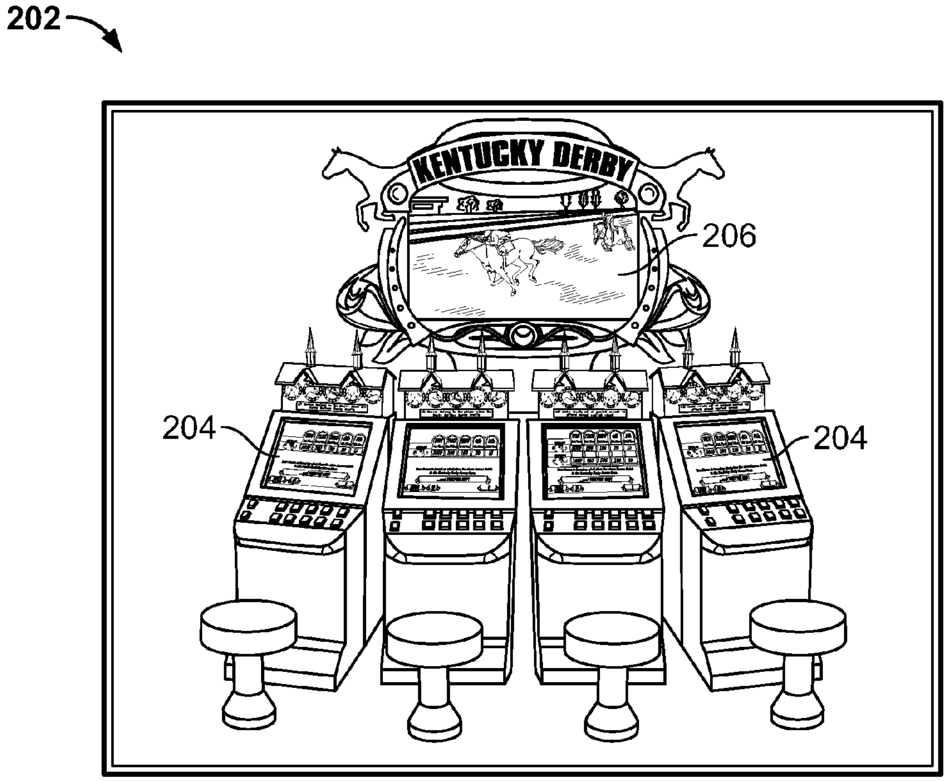
FIG. 2 is an embodiment of a network environment according to a "Kentucky Derby™" community bonus game embodiment of the present invention.

One embodiment 202 of the network environment according to present invention is illustrated in FIG. 2. FIG. 2 shows the embodiment 202 of the present invention implemented as individual gaming machines 204 arranged with a line of sight to a common large screen, or bonus game display 206 upon which the community bonus game is played. This embodiment could also be made without any separate common bonus game display 206, for example, displaying the bonus game on each individual gaming machine 204. It is contemplated that the individual gaming machines 204 may use mechanical spinning reels, a video display or other means for displaying the game. In FIG. 2, there are four individual gaming machines 204, although any number of gaming machines is contemplated. The invention will work with any respective combination of individual gaming machines and common display(s).

Before playing the game in this wagering environment, a player establishes credits on the individual gaming machine through the insertion of money, voucher, credit ticket, or electronic funds transfer which is also well known in the art. The individual gaming machine also uses a pay out hopper, pay out ticket, electronic funds transfer or other mechanism well known in the art to payout the credits on the individual game to the player at the player's request.

Players select a game to play from an array of different gaming machines of the casino, provided that the individual gaming machine selected is a member of the linked network. As mentioned above, the base game can by of any type, such as a video reel slot machine of symbols shown on spinning reels, blackjack, poker, craps, and checkers and so on.

There are many methods to determine when a community bonus game occurs. The community bonus game starts when certain defined criteria are met, such as, when the necessary number of participants qualify by achieving a certain game result on their gaming machine, after a fixed period of time, or after a period of time following a qualifying result. The community bonus game can also start at times determined by the bonus game server (see FIG. 1), and any player playing a gaming machine at that time would qualify for the community bonus game. Or the server may select specific players for inclusion in a bonus round which may be chosen randomly, or using other criteria such as a weighed randomization as a function of the money being wagered. Another embodiment includes the players achieving the best results during a qualifying period who are then invited to participate in the community bonus game. In yet another embodiment, the players may use credits, or money, to qualify for play in the community bonus game. It is also contemplated that the player can earn the right to participate in the community bonus game through results achieved at their gaming machine, but additionally must wager credits to participate in the community bonus game.

The ability to qualify for the bonus game at the gaming machine could be available with any bet at the gaming machine or could require a certain minimum (such as "max bet"). This ability to qualify could instead require a separate "side bet" as is well known in the art. Any method can be used to qualify players for the bonus game so long as the bonus games occur from time to time and some of the bonus games involve at least two gaming machines.

Figure 3:
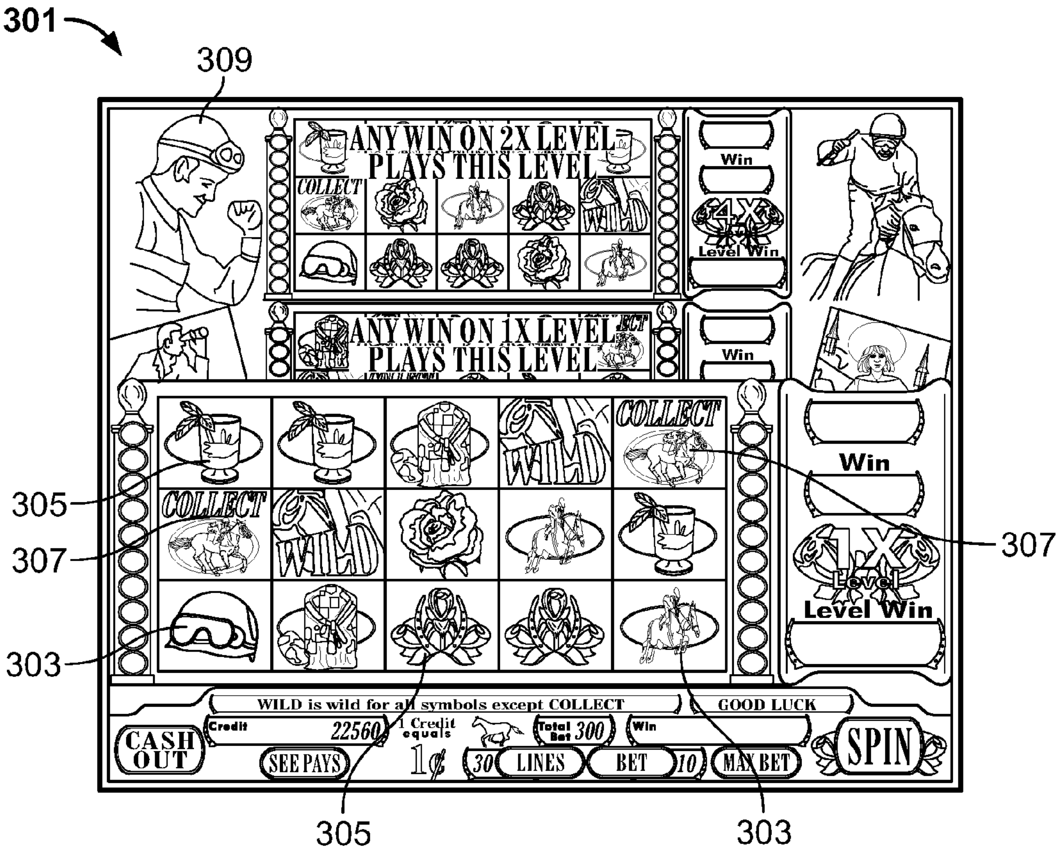
FIG. 3 is an illustrative screen from a "Multi-Strike" video display slot machine showing an embodiment of a base game played in accordance with the "Kentucky Derby™" community bonus game embodiment according to the present invention.

U.S. Pat. No. 6,612,927, the disclosure of which is hereby incorporated herein, discloses the invention of a "Multi-Strike" video slot machine shown in FIG. 3. FIG. 3 is an illustrative screen 301 from a Multi-Strike video slot machine, showing an embodiment of a base game; however, any base game may be used. The base game includes a plurality of electronic rotating reels 303 shown in a display 309, which "spin" and then stop to show symbols 305 on one or more paylines drawn across the reels 303.

In this embodiment, players qualify for the bonus game through bonus game "markers" awarded during play of the base game. These "markers" are awarded through a combination of symbols 305, such as those on a wagered payline. As shown in FIG. 3, the bonus game "markers" are awarded through the "collect horse" symbol 307. Any combination of "collect horse" symbols 307 as well as any quantity or location shown on the display (as dictated by the designer) may qualify a player for participation in the community bonus game. For example, shown in FIG. 3, "collect horse" symbols 307 on the first reel 303 along with a "collect horse" symbol on the fifth reel 303 ("2 scattered collect horse symbols on the first and fifth reels"), qualifies the player for participation in the community bonus game, here a horse race, but any type of bonus game may be used.

Figure 4:
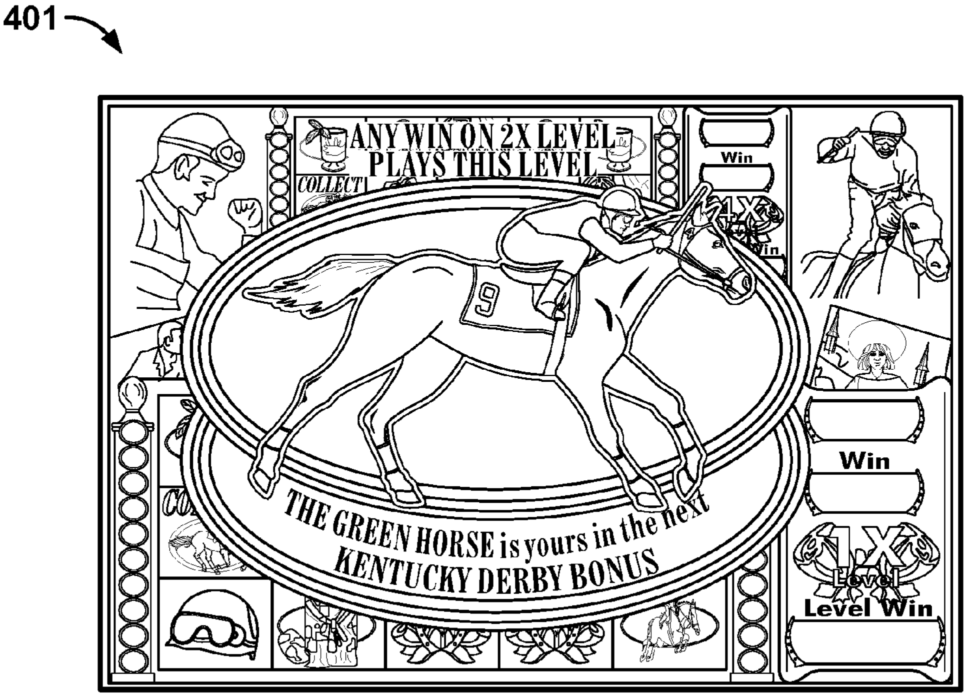
FIG. 4 is an illustrative screen showing a presentation of a bonus game marker in the "Kentucky Derby™" community bonus game embodiment according to the present invention.

FIG. 4 is an illustrative screen showing an embodiment of a presentation of a bonus game marker of the present invention. The display 401 informs the player that he or she has won a "bonus game marker". In this case, the player has won the "Green Horse" in the next community bonus game horse race. The award of a marker can be presented to the player on the display of the individual gaming machine, on the common bonus game display 206 (FIG. 2), or both. It is desirable for other players in the network of linked gaming machines to be notified that a player has won a marker towards participation in the community bonus game. Additionally, the markers won by each player, but not yet redeemed for participation in the community bonus game are displayed upon the display of the individual gaming machine, on the common bonus game display 206 (FIG. 2), or both.

Figure 5:
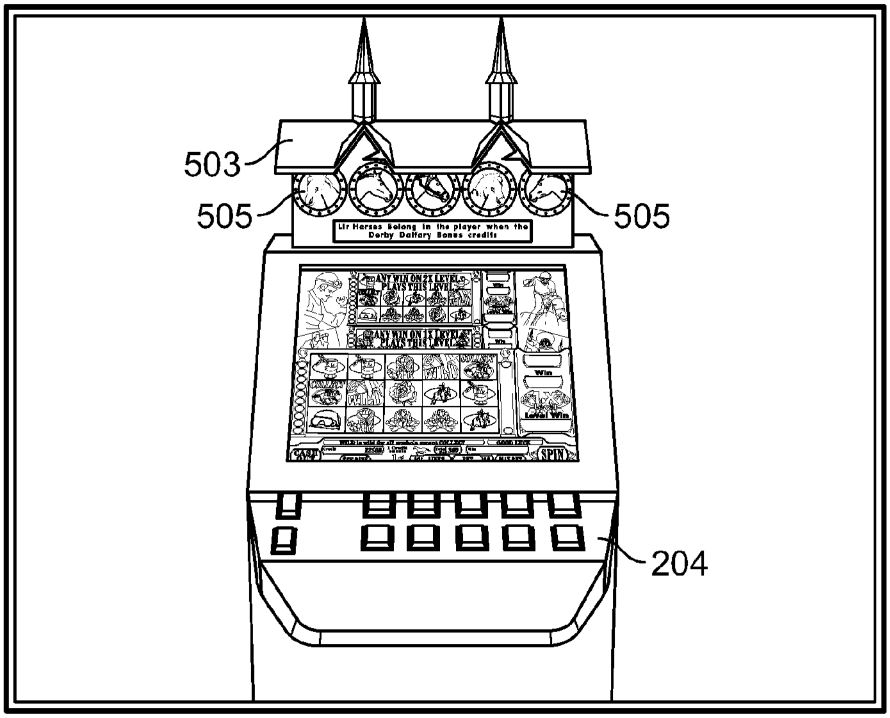
FIG. 5 is gaming machine showing the tracking of a bonus game marker in the "Kentucky Derby™" community bonus game embodiment according to the present invention.

FIG. 5 is a gaming machine showing an embodiment of tracking the bonus game markers that have been awarded. The gaming machine 204 has a topper unit 503 with indicators 505 depicting each of the five possible horses which race in the community bonus game. Each time a bonus game marker (horse) is earned by the player, the indicators 505 depicting that horse is illuminated in the topper unit 503.

FIG. 5 shows that the player has been previously awarded the purple horse (third indicator illuminated) in addition to the just added green horse (fifth indicator illuminated.

The race begins in this version when a pre-determined number of bonus game markers have been distributed to players playing the gaming machines linked to the network. As shown in FIG. 5, there are five possible horses (see indicators 505) for each community bonus game horse race. The community bonus game horse race begins once the plurality of gaming machines awards all five horses, although the bonus game could commence with the aggregation of more or less bonus game markers in the network of gaming machines. Furthermore, each individual gaming machine could win one horse or win all five horses, or any combination.

In one alternate embodiment, there is either a fixed or variable amount of time between the community bonus games. All horses that are awarded during this time period compete in the next community bonus game horse race, which will automatically start if each horse is awarded before the time period expires. This timed embodiment could, however, lead to players sitting idle on their gaming machine waiting for the community bonus game to begin.

Yet another embodiment would start the community bonus game after a fixed number of games have been played. For example, a bonus game is triggered when the network of gaming machines obtains a total number of spins or when any individual gaming machine obtains a total number of spins. The count of the total number of spins on each gaming machine would begin once any gaming machine has been awarded the first bonus game marker. This could be thought of as a "countdown" to the community bonus game horse race once there was at least one horse awarded. This method could provide ample time for the gaming machines in the network to qualify players for the bonus game while providing the opportunity for a single player to participate in the bonus game in a reasonable amount of time without always qualifying all five horses.

Here, the community bonus game horse race begins once the plurality of gaming machines awards all five horses. When the fifth, or last, bonus game marker has been awarded to any player, each player that possessed one or more bonus game markers would be notified that the community bonus game was about to begin. This notification could be any noticeable audio or visual cue on the display of the individual gaming machine, on the common bonus game display 206 (FIG. 2), or both. Furthermore, blinking a light in the topper unit 503 could convey the notification that the community bonus game was about to begin.

Figure 6:
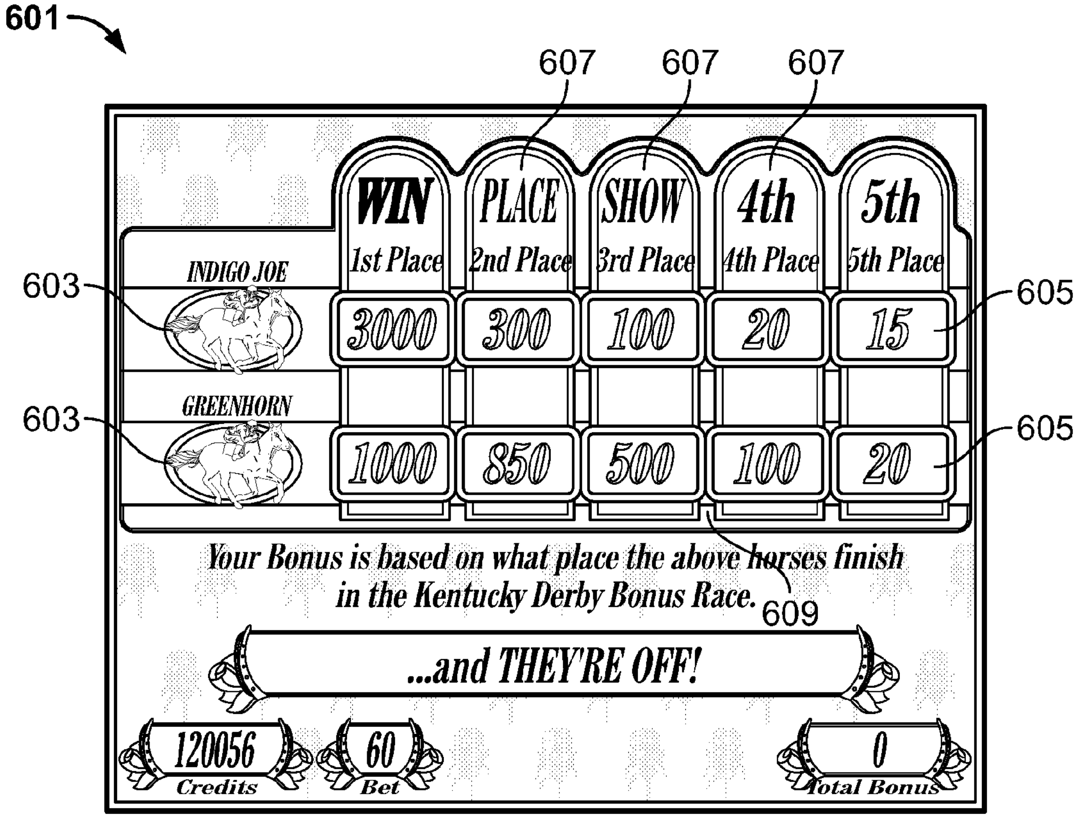
FIG. 6 is an illustrative screen showing a paytable in the "Kentucky Derby™" community bonus game embodiment according to the present invention.

FIG. 6 is an illustrative screen showing an embodiment of a paytable of a community bonus game according to the present invention. The paytable screen 601 shows a paytable 609 for each horse (bonus game marker) 603 earned by the player. The paytable 609 shows the payout value 605 for each possible finishing position 607 of the horse in the community bonus game race. In this preferred embodiment, there is a non-zero pay for each possible finishing position of the horse to make sure that each player that qualifies for the bonus game receives at least a nominal payout. It is further contemplated that the paytable could include horse-finishing positions that paid zero without departing from the invention.

FIG. 6 specifically illustrates a paytable screen 601 for a player that has been awarded the purple horse and green horse bonus game marker 603. Different payout values 605 are provided for the purple horse (Indigo Joe) and green horse (Greenhorn). As those skilled in the art are familiar, the expected payout value of each horse can be computed using the weighted sum of each possible result. The expected values (EV) of these two horses (given a fair one in five chance of each finishing position) is calculated as:

$$EV(purple)=0.2*3000+0.2*300+0.2*100+0.2*20+0.2*15=687$$

$$EV(green)=0.2*1000+0.2*850+0.2*500+0.2*100+0.2*20=494$$

The game is able to use this type of computation to create a paytable that provides any arbitrary expected value, allowing players wagering any number of credits or any denomination, to simultaneously play in the same community bonus game horse race. For example, in the same denomination, if a player received the same winning combination while wagering five times the number of credits as the player that received the green horse above, the horse awarded to such a player would have an EV that is five times the 494 credit EV of the green horse (Greenhorn) or 2470 credits.

Each player that received a bonus game marker would see a similar paytable screen showing the paytable for the horses that they were awarded. The paytable displays could be presented to the player on the display of the individual gaming machine, on the common bonus game display 206 (FIG. 2), or on another device without departing from the invention.

As is well known in the art, given the probability of each possible finish for a particular horse, the paytable for each horse has its own expected value that is individual of the expected values of the other horses. The horses could be raced with any type of weighting scheme (making different finishing positions more or less likely) but in the preferred embodiment all horses have the same chance for each finishing position to allow each paytable to be fully individual of each other, for example, five horses with each horse having a 1/5 or 20% chance of finishing in each of the five finishing positions.

This allows the game to provide the paytable of each horse based on the amount, or denomination and number of coins wagered, of the bet that was made resulting in the award of the bonus game marker horse. Using this scheme, different players that are making very different sized wagers can all participate in the community bonus game in which multiple players participate.

Another novel aspect of this invention (which may be a separate embodiment or combined with any of the previously mentioned embodiments) is the ability for any player to use credits or money to buy their participation, or entry, into the community bonus game. With this aspect of the invention, once the community bonus game begins, a player that has not earned a bonus game marker may use credits or money to buy participation in the bonus game. The player touches a control, or button, once the bonus game is initiated. The player could specify any amount to be wagered on the bonus game and the system would provide a horse with an expected value that provided the house, or casino, with a desired hold percentage. For example, if the player wagered 500 credits to buy an entry in the bonus game and the game was set for a 90% return (10% hold) on elective bonus game bets then the player could receive a horse with the following paytable:

$1^{st}$—1000
$2^{nd}$—750
$3^{rd}$—280
$4^{th}$—120

This horse would have an expected value calculated as follows:

$$EV(500\ credit\ horse\ 1)=0.2*1000+0.2*750+0.2*280+0.2*120+0.2*100=450$$

Another combination that would yield the same 450 credit (or 90%) EV is:

$1^{st}$—800
$2^{nd}$—600
$3^{rd}$—400
$4^{th}$—250
$5^{th}$—200

This horse would have the same expected value calculated as follows:

$$EV(500\ credit\ horse\ 2)=0.2*800+0.2*600+0.2*400+0.2*250+0.2*200=450$$

In the above examples, the first horse is more volatile than the $2^{nd}$ horse, resulting in higher possible wins in the best cases but lower results in worse cases. In another embodiment, the player could select between horses with differing volatility. Using the cases above, a player that made a 500 credit wager to enter the bonus game could select "500 credit horse 1" or "500 credit horse 2" depending on the volatility that they preferred for that race. Likewise, a player that is awarded a bonus game marker horse through the play of the game could select from different possible paytables depending on their desired volatility.

This concept of adding credits to allow play in a bonus game that was not earned by the player can be extended to allow players that have earned a bonus game marker to enhance their bonus game. Just as the player who did not qualify for the bonus game could buy a horse, the player that does qualify with one or more horses may buy additional horses. It may be desirable to sell these additional horses with a lower house edge, rewarding the player that has played the game enough (or become lucky enough) to win the horses in the race. The players may also be allowed to increase the EV of the horses that they won by using credits or money.

Another way to allow multiple players who may be making very different sized wagers to bet on the same horse during a community bonus game could be accomplished using the familiar "odds" mechanism used for horse wagering at race tracks. In this scenario, the player receiving a bonus game marker would receive a number of "wagering credits" based on their initial bet amount. Upon entry to the community bonus game, each horse would show the "odds" or return for each finishing place. For example, taking the expected value for the green horse (Greenhorn) discussed above:

$$EV(\text{green horse})=2*1000+0.2*850+0.2*500+0.2*100+0.2*20=494$$

Using the "odds" mechanism, the 494 credit bonus game marker awarded to a player could alternately win ten "wagering credits" for the bonus game. The green horse would then show the following odds:

$1^{st}$—100 for 1
$2^{nd}$—85 for 1
$3^{rd}$—50 for 1
$4^{th}$—10 for 1
$5^{th}$—2 for 1

This would yield the same 494 credit expected value. Another player that received a bonus game marker while wagering half the amount of this player would only receive five "wagering credits" while a player that received a bonus game marker while wagering twice the amount of this player would receive twenty wagering credits. This would allow multiple players to all wager on the same horse if desired even while playing different denominations or different number of credits. This would be very desirable in some group settings, allowing all players to wager on the same horse and cheer on together.

In any of these embodiments, any players, including those that did not win bonus game markers may make additional side bets on the race. Any standard type of wager found in live horse racing could be offered in addition to new types of wagers created specifically for this game. For example, credits could be wagered on a particular horse to win ($1^{st}$ place), place ($2^{nd}$ place) or show ($3^{rd}$ place), or for a quinella (first two horses in either order) or perfecta (first two horses in exact order) combination.

In certain embodiments, players will be able to buy bonus game assets at fixed prices. For example, a player could buy the paytable of the horse of another player for a fixed number of credits corresponding to the EV of that horse. Alternatively, a specific horse could pay based on different paytables for different players in the game. In this case, each gaming machine would call out the paytable for the horse based on the bet at that gaming machine. It is also contemplated that the option to play in the bonus game has a fixed value and is sold to a player based on that fixed value.

Figure 7:
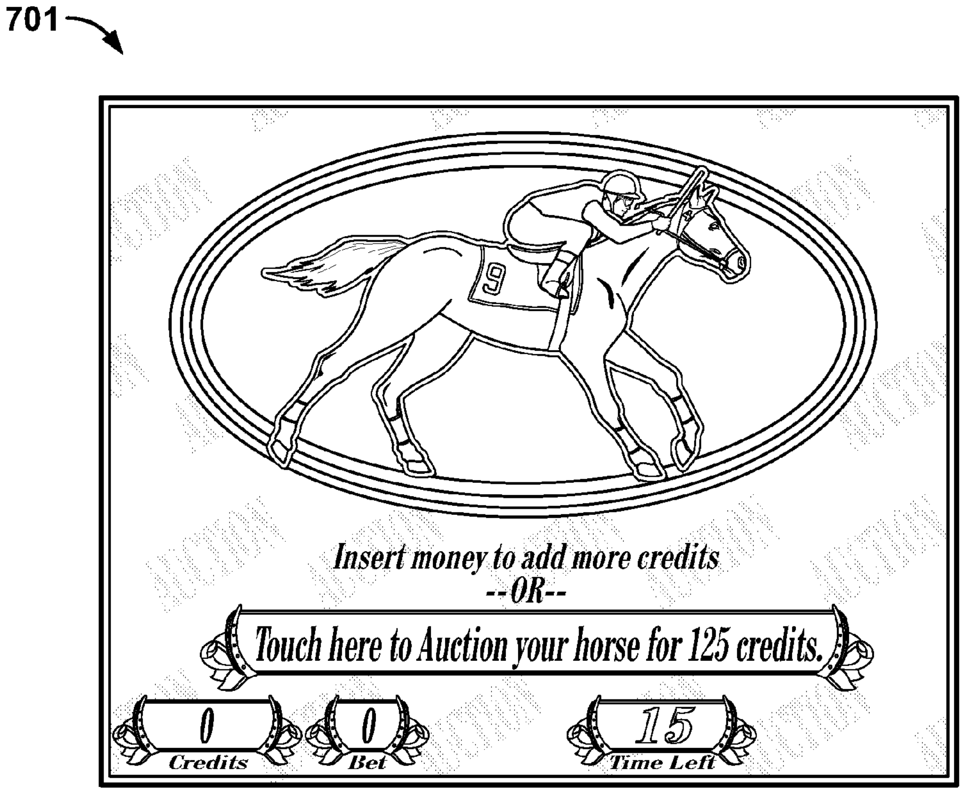
FIG. 7 is an illustrative screen showing the redemption of a bonus game marker in the "Kentucky Derby™" community bonus game according to the present invention.

There may be conditions where a player has achieved a bonus game marker and does not want to wait for the bonus game to start, which could be an unknown amount of time in the future. This could happen because the player runs out of credits playing the base game, simply does not have the time to wait for the bonus game or desires a guaranteed average payoff rather than the more volatile return provided by the race. In this case, the player may have an option to redeem any bonus game markers accumulated for a value approximately equal to the expected value of the horse. When the player runs out of credits, or hits the cash-out button while possessing a bonus game marker, a screen could be displayed like the one shown in FIG. 7. FIG. 7 shows an illustrative screen showing the option to "auction off the horse" 701. This option allows the player to convert the bonus game marker to credits or money.

In any of the scenarios described above, once the bonus game has been initiated by whichever method and the players have completed any additional wagering on the bonus game, then the bonus game begins. There could be a timer in which all player decisions must be completed, or the network of gaming machines could wait until all players become inactive with regard to new wagers. During this time, the players may see the horses walked up to the starting gate one at a time, leading up to the start of the race.

The bonus game would occur as a horse race including at least all horses that are assigned to any player or otherwise having received a wager. The community bonus game horse race is presented to the player on the display of the individual gaming machine, on the common large screen display 206 (FIG. 2), or both. At the end of the race, the gaming machine displays show the finishing order of the horses and all appropriate awards credited to the players.

Figure 8:
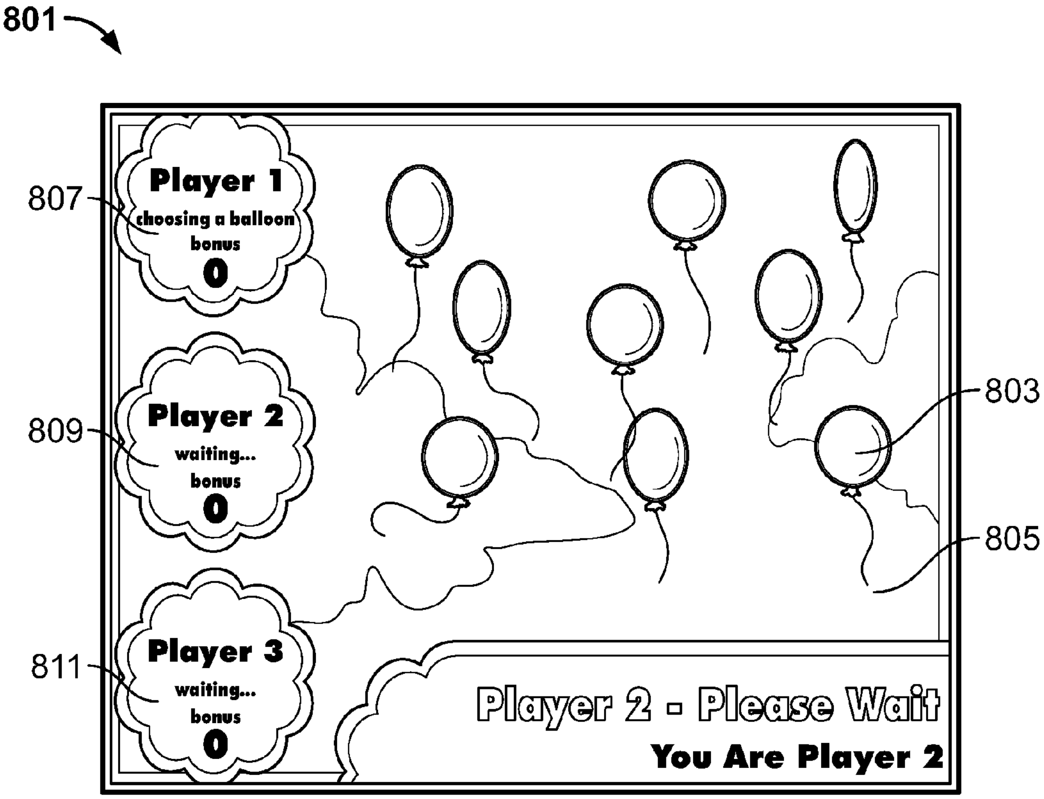
FIG. 8 is an illustrative screen showing an embodiment of a balloon popping community bonus game according to the present invention.

FIG. 8 is an illustrative screen 801 showing an alternate embodiment of a community bonus game according to the present invention. The qualified players take turns selecting from hidden values presented to the player on the display of the individual gaming machine, on the common bonus game display (FIG. 2), or both. FIG. 8 shows the prize values hidden behind a matrix of balloons 803. Qualified players take turns "popping" balloons by touching a balloon on the touchscreen display 805 on their individual gaming machine. Each gaming machine shows the same matrix of balloons 803 as well as the amount that each player has won in the bonus 807, 809, 811. In this example, there are three players participating in the community bonus although more or less could be used without departing from the invention. FIG. 8 shows the display of "Player Two" while "Player One" makes the first selection in the bonus game. The ordering of the players in the bonus game is determined by the bonus game server and could be determined randomly, based on which player qualified the earliest, which player qualified with the highest score, or by position in the group of games, or by any other criterion.

Figure 9:
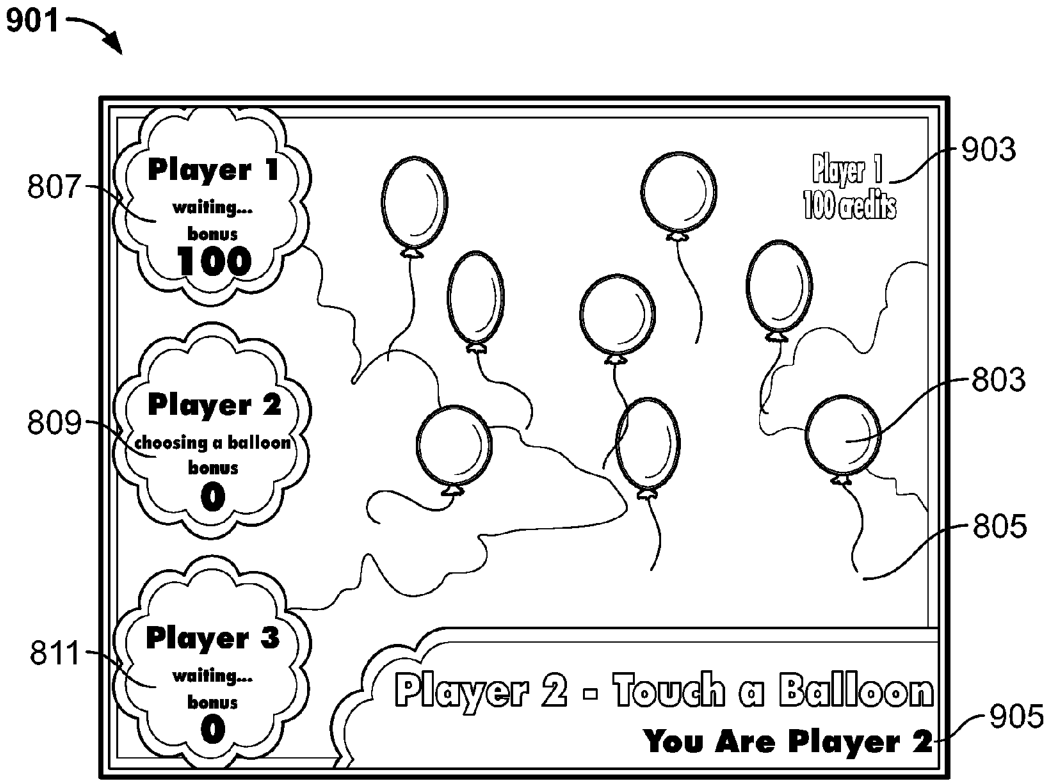
FIG. 9 is an illustrative screen showing an aspect of the balloon popping community bonus game according to the present invention.

FIG. 9 is an illustrative screen 901 showing the community bonus game after Player One touches a balloon from the matrix 803 on the touchscreen display 805 of the gaming machine. All players see the balloon pop 903 to reveal a value (100 credits) at their gaming machines, although FIG. 9 illustrates the touchscreen display 805 viewed by Player Two. The value is added to the Player One Bonus meter 807. A flashing prompt 905 notifies Player Two to select a balloon from the matrix 803.

Figure 10:
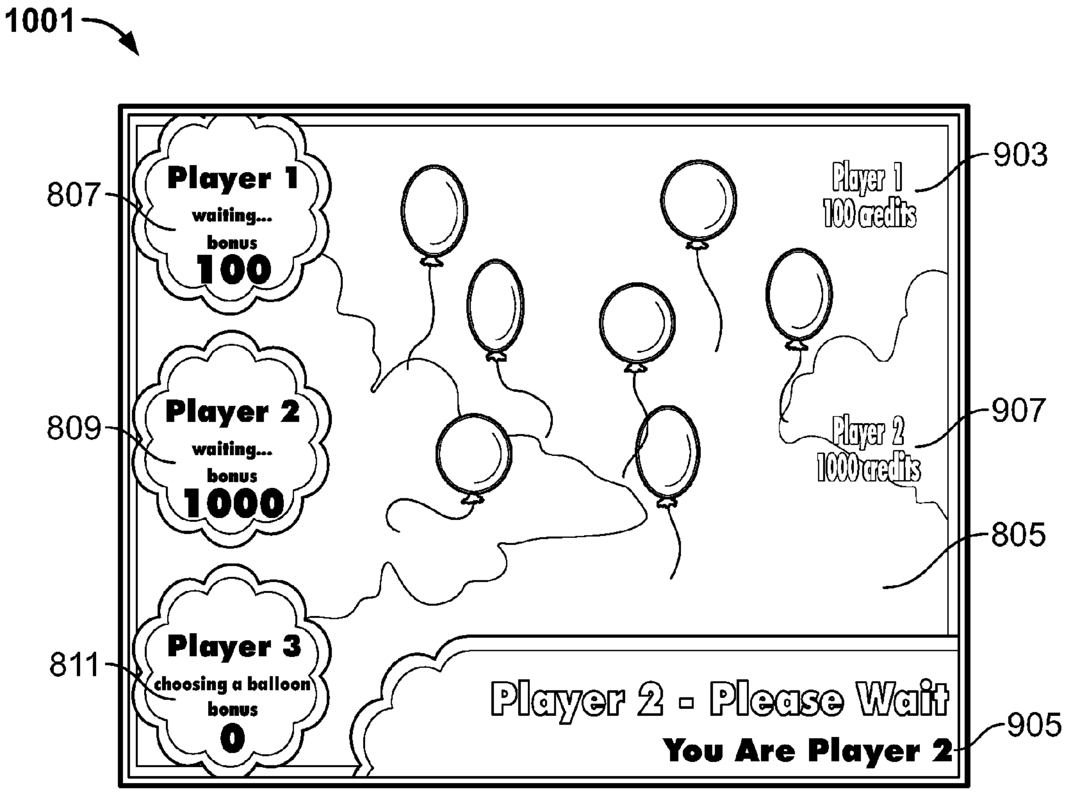
FIG. 10 is an illustrative screen showing an aspect of the balloon popping community bonus game according to the present invention.

FIG. 10 is an illustrative screen 1001 showing the community bonus game after Player Two touches a balloon from the matrix 803 on the touchscreen display 805 of the gaming machine. All players see the balloon pop 907 to reveal a value (1000 credits) at their gaming machines. The value is added to the Player Two Bonus meter 809. The flashing prompt 905 notifies Player Two to wait while Player Three selects a balloon to pop.

In this particular example, each of the three qualified players will continue to select a balloon in sequence until each player has made three selections. Ideally, there will be at least one balloon that conceals a credit value that is much higher than most of the other balloons, thus resulting in a competition among the players to be the one to pop this balloon.

With a set of credit values randomized and unknown to any player, the introduction of competition for the large prize does not change the expected result for each player. That is, at the start of the bonus game, each player has an expected return of one-third of the total credit amount contained in a matrix of nine balloons. It is well understood by those skilled in the art that even if the large award is selected before a particular player gets their first selection, thus making it unavailable in gameplay, that this is offset by the times that the other players do not select the top award and this player now has fewer "wrong" choices. Specifically, there is no player skill in this embodiment and players will tend to earn one-third of the total credit pool over the long run, however in a very real way, they are competing with each other for the "big award". At least one player will get the "big award" every time a "three-player, nine-balloon, three-pick" bonus game is played.

There are many variations of this embodiment, which could use different numbers of selections, balloons or players. While the criterion for the end of this bonus game is that each player has popped three balloons, the bonus game ending criteria could be varied such as when any player pops the big award or until each player hits a bonus ending pick (such a balloon filled with water). Other criteria could be used to determine the end of the game and other features may be contemplated such as free picks or "award all red balloons".

Figure 11:
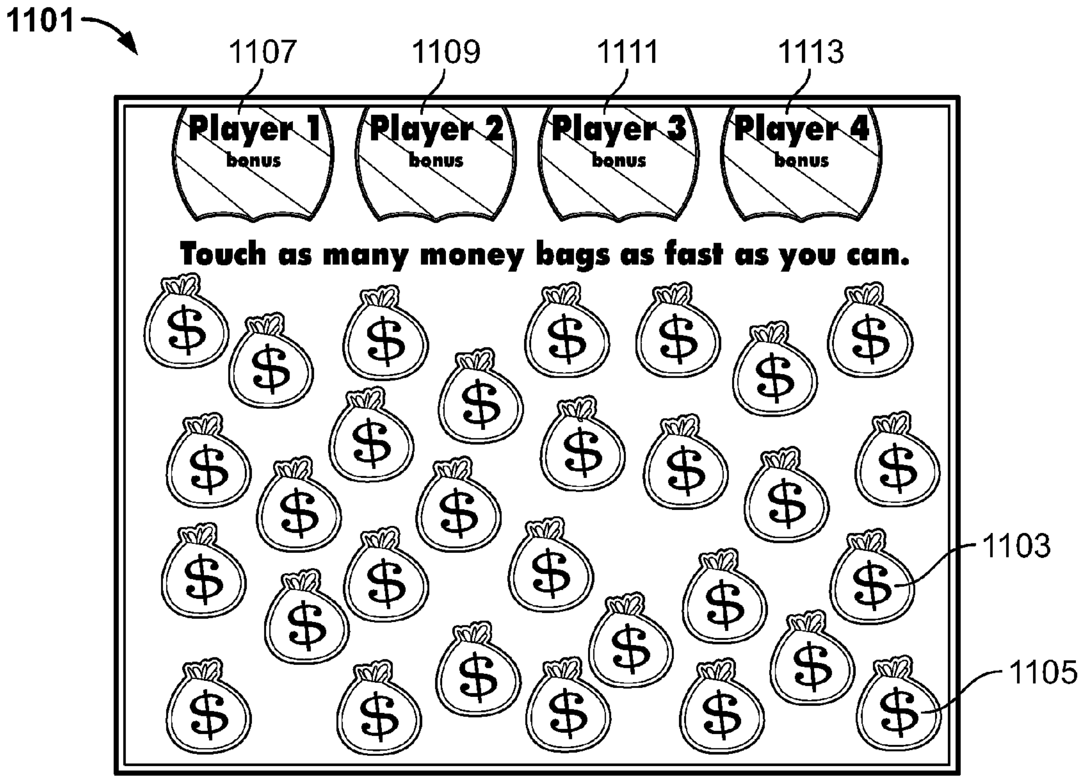
FIG. 11 is an illustrative screen showing an embodiment of money bag community bonus game according to the present invention.

Community bonus games could be dependent on player skill influencing the outcome of the bonus game. FIG. 11 is an illustrative screen 1101 showing the community bonus game based on skill. Each gaming machine in the network shows a matrix of money bags 1103 on the touchscreen display 1105, along with the bonus meters 1107, 1109, 1111, 1113 of each player. When the bonus event begins, each player tries to touch as many money bags 1103 as quickly as possible. The first person to touch a money bag will cause its contents to be revealed on screen and the value is added to the bonus meter 1107, 1109, 1111, 1113 of that player. The money bag will then disappear from each player's touchscreen display 1105.

The community bonus game ends in this version when all of the money bags 1103 have disappeared. This bonus game could also run for a fixed time period. The more skillful players will win more as they touch more money bags first and spend less time poking at money that is on its way to another player's bonus meter 1107, 1109, 1111, 1113. Collecting more money bags will not only increase a player's aggregate total, but will also make it more likely for that player to win any scarce large awards in the matrix of money bags 1103.

Figure 12:
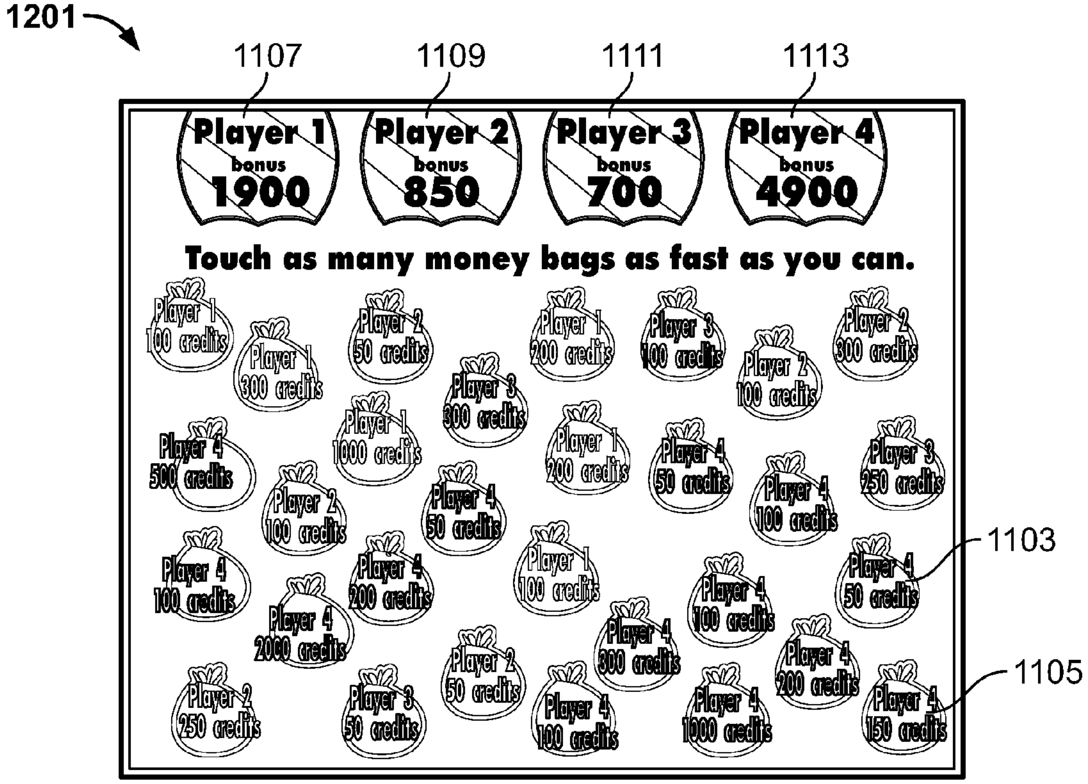
FIG. 12 is an illustrative screen showing an aspect of the money bag community bonus game according to the present invention.

FIG. 12 is an illustrative screen 1201 showing the community bonus game after four participating players have touched all available money bags 1103 on the display 1105. After a money bag 1103 is poked and disappears, the value revealed is added to the bonus meter 1107, 1109, 1111, 1113 of the player that poked at that money bag 1103. This embodiment provides a known average return for the group of participating players, but, just as in a casino poker room or with casino sports betting, the better skilled players will win more at the expense of the less skilled players.

Another embodiment of an interactive community bonus game of the present invention has a mixture of luck and skill while using the turn-taking approach of the balloon bonus game discussed above. This embodiment is a modified version of the classic "hangman" game where players take turns guessing letters in a word or phrase.

Figure 13:
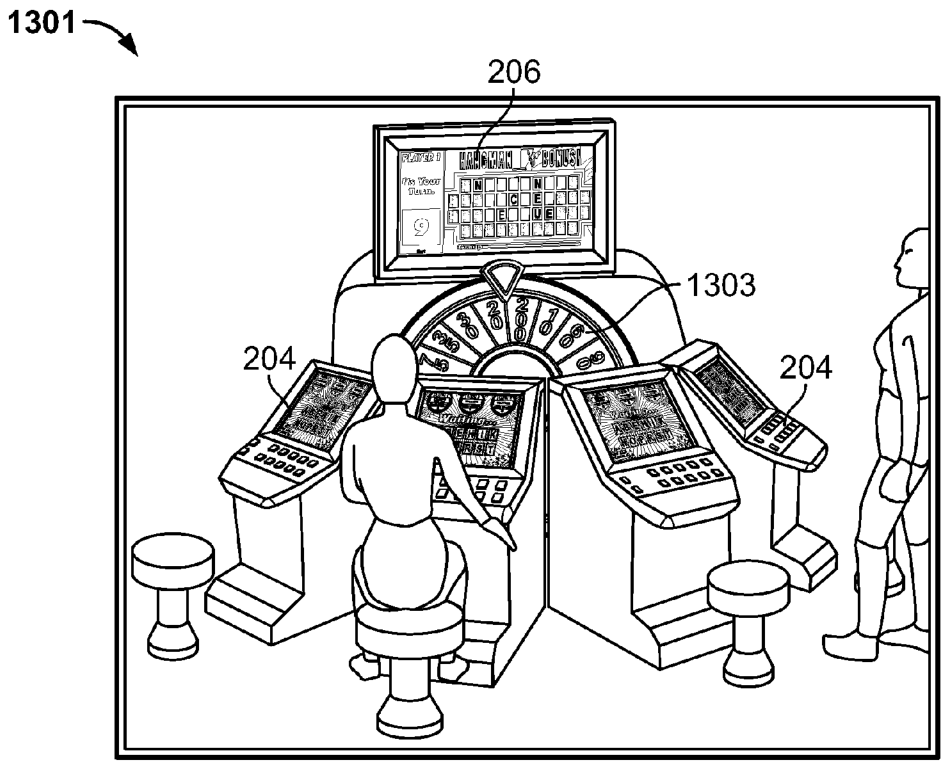
FIG. 13 is an embodiment of a network environment according to a "Hangman" community bonus game embodiment of the present invention.

While this embodiment requires at least two gaming machines, it is preferably played with more than six gaming machines and in this example, a group of twelve gaming machines. Similar to FIG. 2, FIG. 13 shows this embodiment 1302 implemented as twelve (four shown) individual gaming machines 204 arranged with a line of sight to a common large screen, or bonus game display 206 upon which the community bonus game is played. This embodiment could also be made without any separate common bonus game display 206, for example, displaying the bonus game on each individual gaming machine 204. A large bonus wheel device 1303 is positioned under the bonus game display 206. The bonus wheel device 1303 is an optional add-on, which is preferably a physical mechanical wheel that spins however this could also be provided on the video display of each gaming machine 204.

In this gaming environment, before playing the game, a player establishes credits on the individual gaming machine through the insertion of money, voucher, credit ticket, or electronic funds transfer which is also well known in the art. The individual gaming machine also uses a pay out hopper, pay out ticket, electronic funds transfer or other mechanism well known in the art to payout the credits on the individual game to the player at the player's request.

Figure 14:
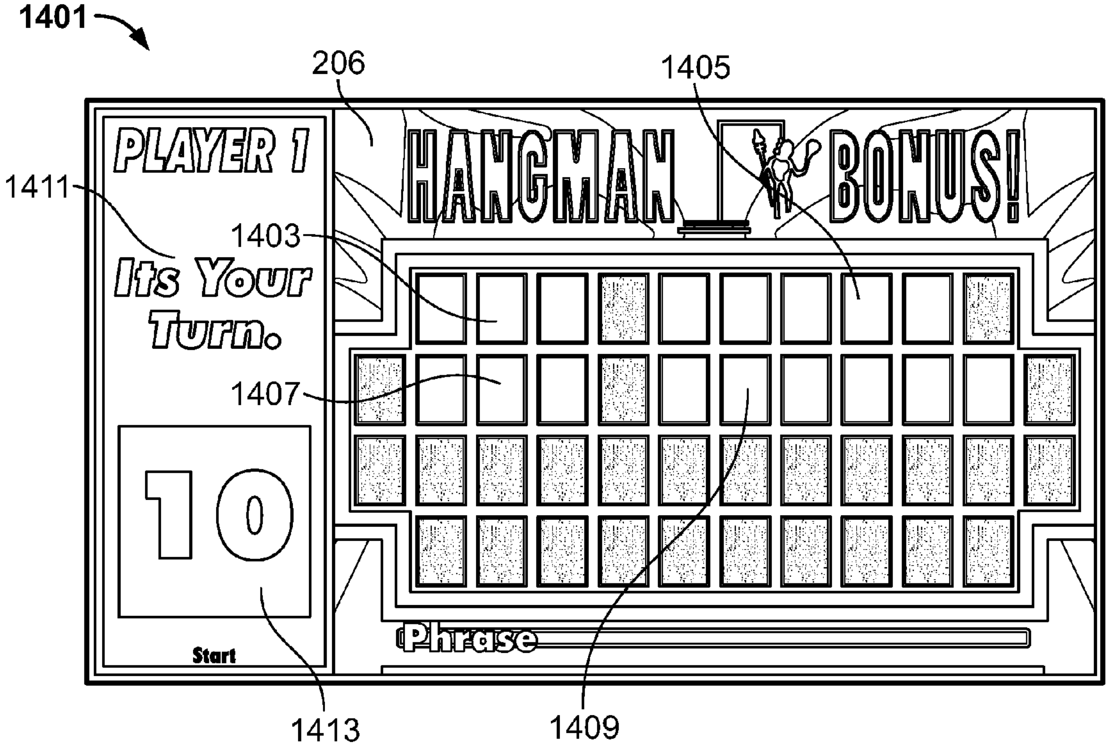
FIG. 14 is an illustrative screen showing an aspect of the "Hangman" community bonus game according to the present invention.

In this embodiment, a phrase or set of words, such as a name or place is shown on the common bonus display 206 by the number of letters in each word such as the four words 1403, 1405, 1407, 1409 shown in the illustrative screen 1401 of FIG. 14. The letter of each word 1403, 1405, 1407, 1409 are shown as highlighted squares. The common bonus game display 206 shows that it is Player One's turn 1411 to select a letter and shows a countdown timer 1413, which provides ten time units (seconds) for this player to select a letter although any number of time units is contemplated. The time units count down. If the timer 1413 hits zero before the player selects a letter then the computer will randomly select one of the letters for the player. Other well defined algorithms could be used for the automatic selection of a letter by the computer or in another embodiment; the player could lose their turn if a letter is not selected before the timer 1413 expires.

Figure 15:
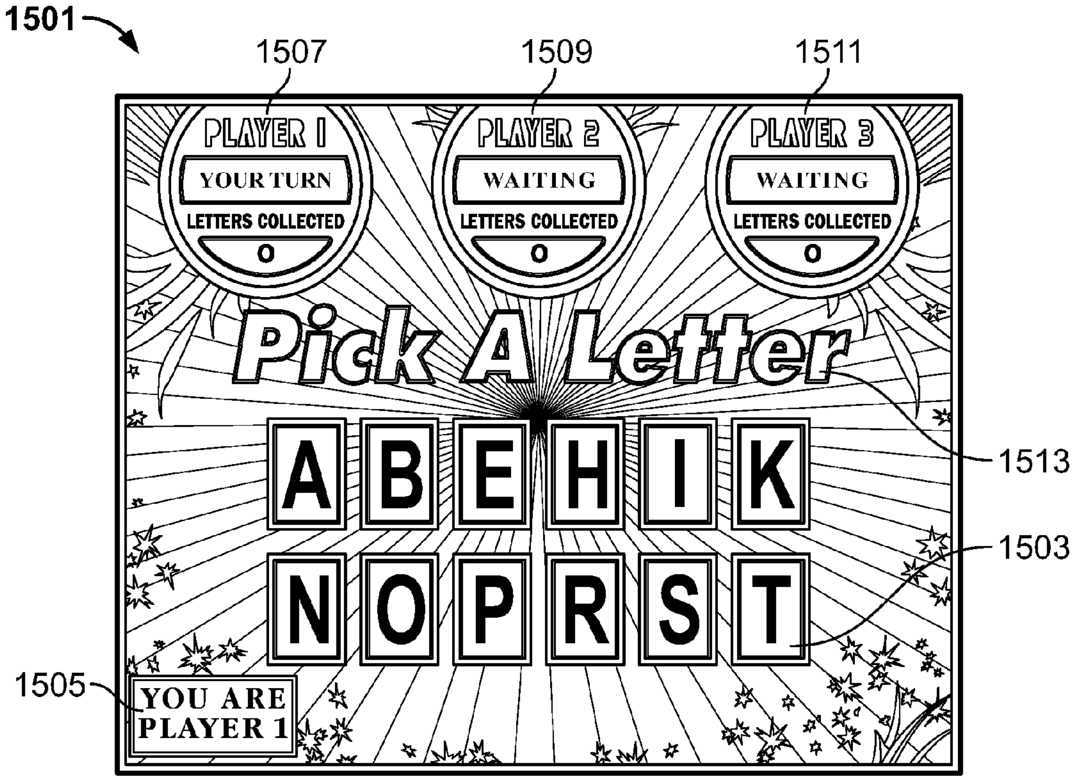
FIG. 15 is an illustrative screen showing an aspect of the "Hangman" community bonus game according to the present invention.

The gaming machines that qualify for the bonus game will be assigned an identity by the bonus game server as described above in reference to FIG. 1 and will show this identity indicator on each individual gaming machine display. The identity indicator 1505 in FIG. 15 is shown on each individual gaming machine display to assist the players in identifying the score and turn in the game corresponding to the bonus signs 1507, 1509 and 1511. The identity indicator does not correspond to a particular individual gaming machine, but is solely based on the assignment by the bonus game server. FIG. 15 shows the display 1501 including the identity indicator 1505 of Player One. Player One can view the corresponding bonus sign 1507 to determine his or her turn and score of "letters collected". The bonus sign 1507 of Player One illustrates "Your Turn" and zero "letters collected". The display 1501 further includes Player Two bonus sign 1509 and Player Three bonus sign 1511 so that Player One can monitor his or her status compared to the other players. The Player One display 1501 shows all possible letters 1503 that are used in the phrase. In another embodiment the letters in the phrase are not shown and players could select from all possible letters resulting in some fruitless guesses. Thus, a variety of scoring conditions are contemplated, for example selecting a letter that is not revealed in the phrase, selecting a letter that is revealed in the phrase, or selecting a letter a letter that is revealed with multiple occurrences in the phrase. Likewise, a selected letter could have an additional scoring condition, such as a bonus amount, free turn, etc.

The display 1501 shows a bright background and a prominent prompt area 1513. The prompt area 1513 illustrates "Pick A Letter" conveying it is Player One's turn to select a letter.

In this embodiment, the players play in the order of the assigned player identity, or number. Other embodiments may play in different orders without departing from the invention. The player could be required to enter his or her name, or the name on their player tracking card could be shown on the screen as these methods are well known in the art.

Figure 16:
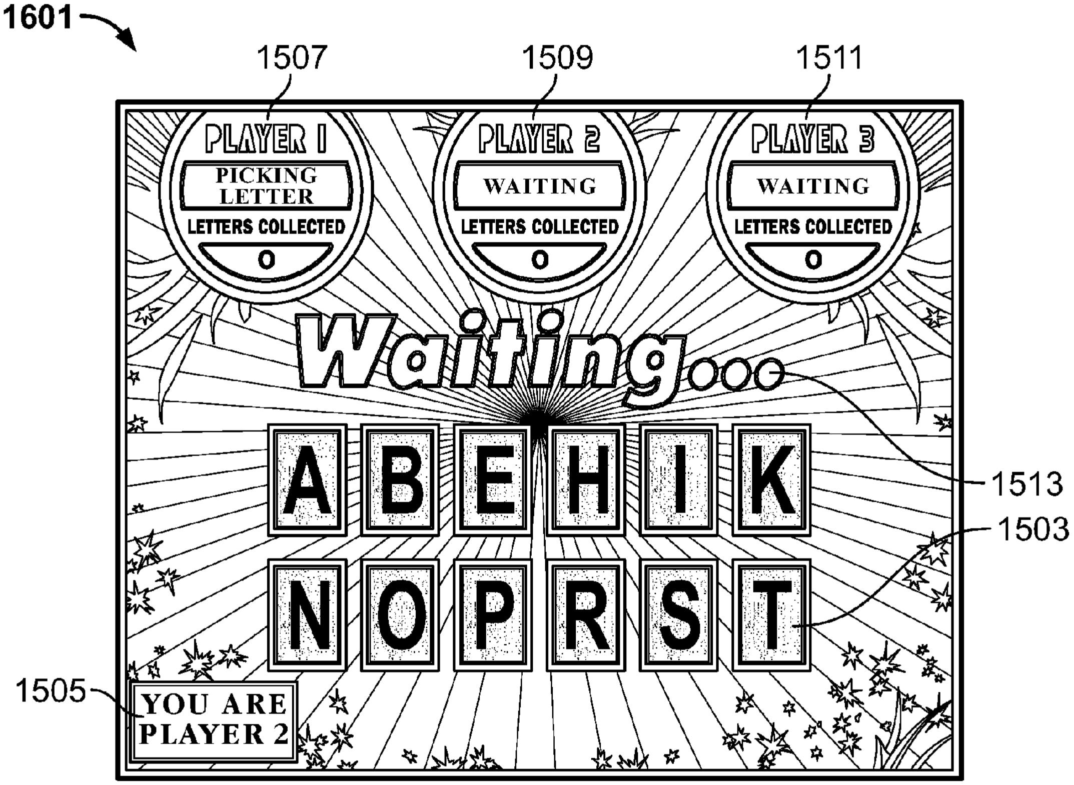
FIG. 16 is an illustrative screen showing an aspect of the "Hangman" community bonus game according to the present invention.

FIG. 16 shows the display 1601 including the identity indicator 1505 of Player Two. The Player Two display 1601 is shown simultaneously with the display 1501 of Player One as shown in FIG. 15. The display 1601 further includes the bonus signs of each player 1507, 1509, 1511. The bonus sign 1507 of Player One illustrates that Player One is "Picking Letter" while Player One sees "Your Turn" as shown in FIG. 15. The Player Two bonus sign 1509 and Player Three bonus sign 1511 show "Waiting". In addition, the display 1601 shows a prompt area 1513 on the display 1601. The prompt area 1513 illustrates "Waiting". The Player Two display 1601 shows all possible letters 1503 that are used in the phrase, but since it is not Player Two's turn, the display 1601 of Player Two shows letters 1503 with a grayed background.

Figure 17:
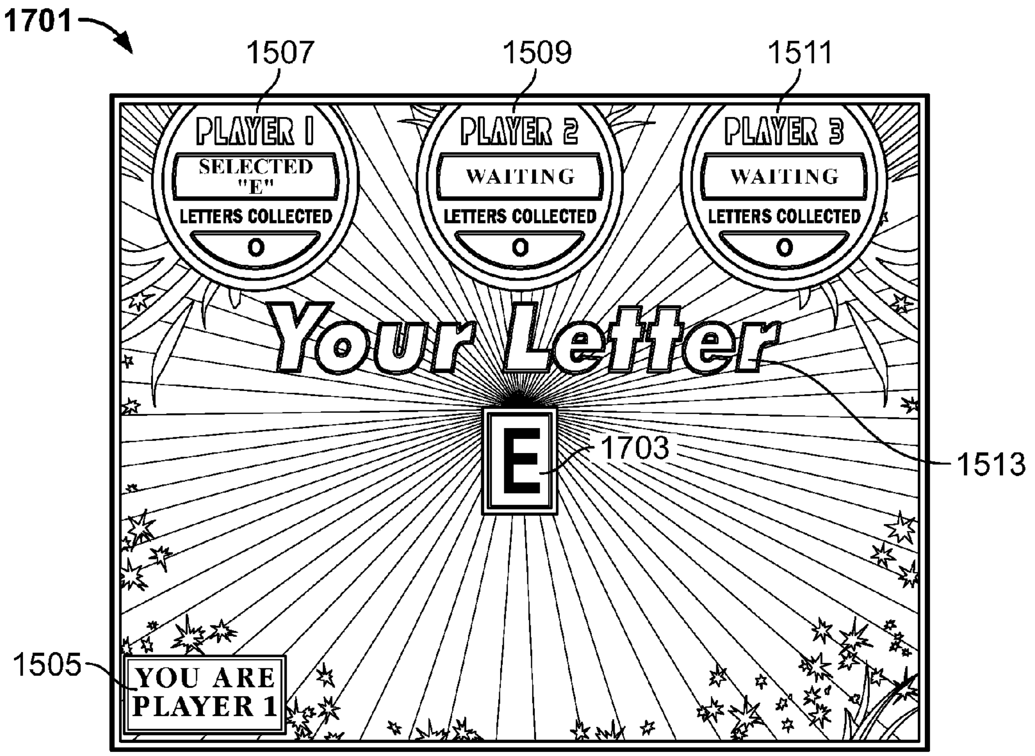
FIG. 17 is an illustrative screen showing an aspect of the "Hangman" community bonus game according to the present invention.

In this example, Player One touches the letter "E" on the touchscreen display. The gaming machine sends a message to the bonus game server indicating that the letter "E" was selected. FIG. 17 is an illustrative screen showing the display 1701 on Player One's gaming machine after Player One selected the letter "E". All letters are removed and the letter "E" 1703 is displayed with the prompt area 1513 illustrating "Your Letter". The bonus game sign 1507 shows letter "E" was selected. The bonus game server sends messages to the other participating gaming machines which cause the letter "E" to be removed from the possible letters from each individual gaming machine.

Figure 18:
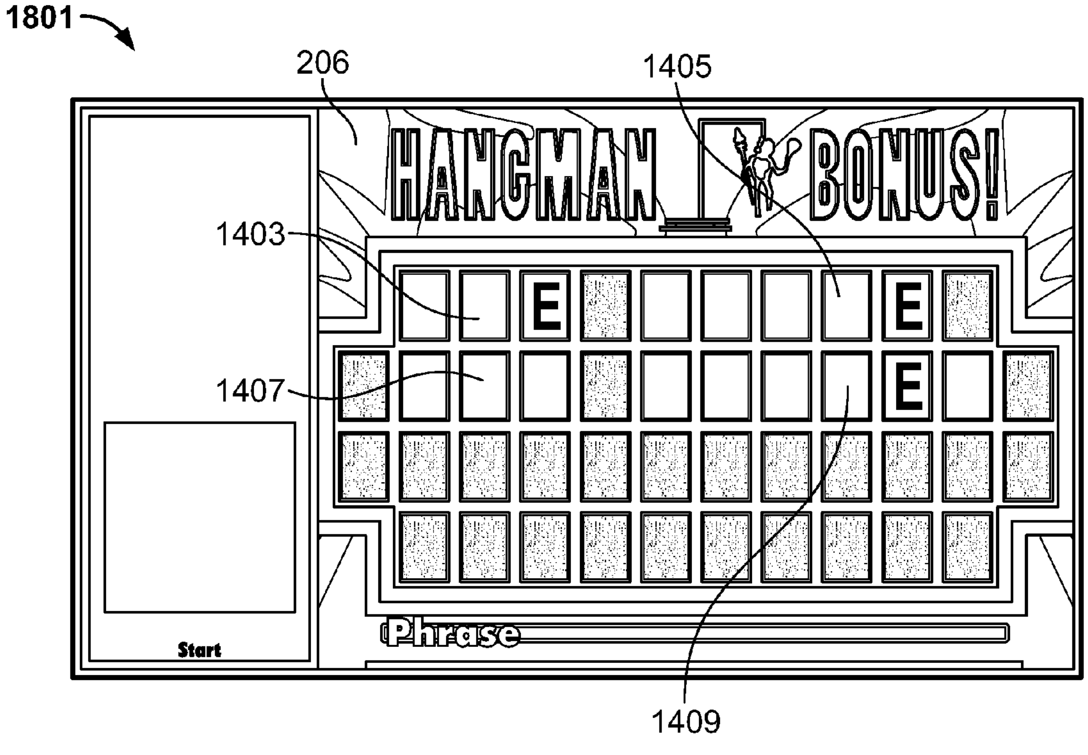
FIG. 18 is an illustrative screen showing an aspect of the "Hangman" community bonus game according to the present invention.

The bonus game server modifies the common bonus game display 206 (FIG. 13) to show each occurrence of the selected "E" in the phrase. FIG. 18 is an illustrative screen 1801 showing a community bonus game display 206 after the three E's in the words 1403, 1405, 1409 of the current phrase have been revealed. As each letter is revealed on the bonus game display 206 by the bonus game server, a message is sent to each participating gaming machine to increment the "letters collected" counter on the bonus game sign 1507, 1509, 1511 (FIG. 15) to be incremented for the current player.

Figure 19:
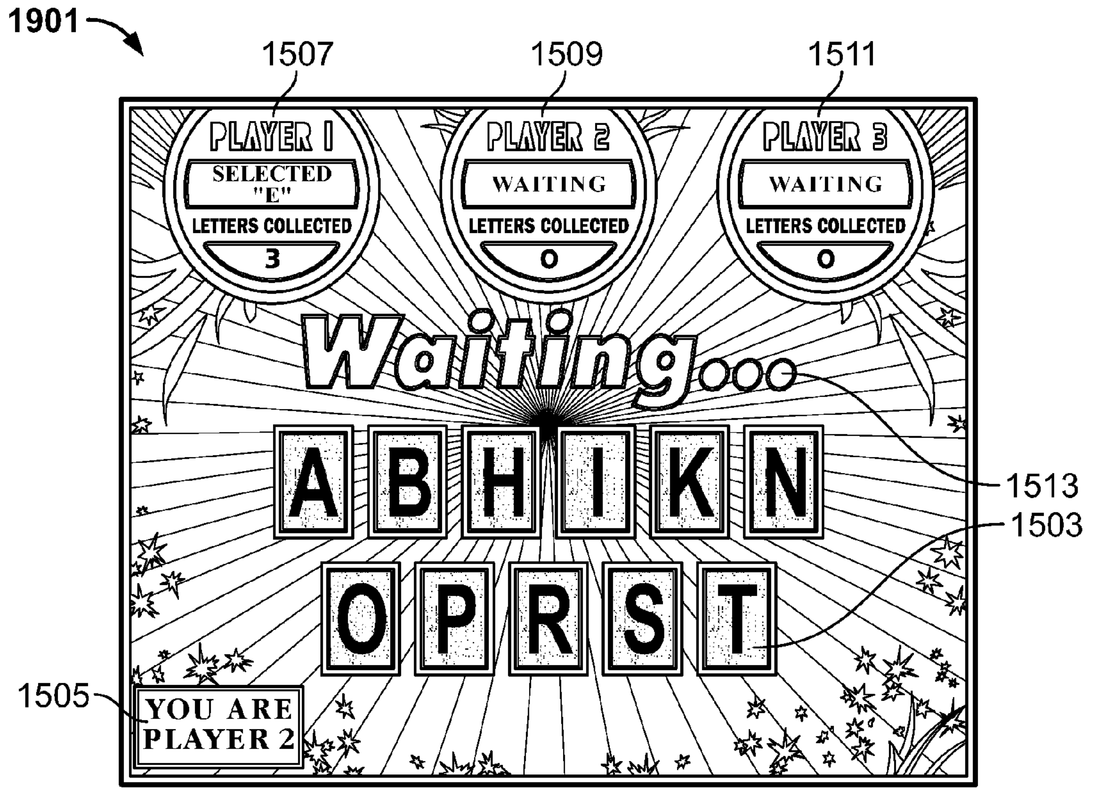
FIG. 19 is an illustrative screen showing an aspect of the "Hangman" community bonus game according to the present invention.

FIG. 19 shows the display of the Player Two gaming machine at the end of the sequence described in FIGS. 15-18. The Player Two display 1901 is shown simultaneously with the display 1701 of Player One as shown in FIG. 17. The display 1901 further includes the bonus signs of each player 1507, 1509, 1511. The bonus sign 1507 of Player One illustrates that Player One "Selected E" and earned three "letters collected". The Player Two bonus sign 1509 and Player Three bonus sign 1511 show "Waiting". In addition, the display 1901 shows a prompt area 1513 illustrating "Waiting . . . ". The Player Two display 1901 shows all remaining possible letters in the phrase. The remaining possible letters 1503 are all possible letters shown in FIG. 16 with the letter "E" removed.

The play now moves to Player Two. In an embodiment where the usable letters are not shown, a player could be allowed to select again after a successful guess. In the current embodiment, each guess is guaranteed to have at least one letter in the phrase and the play passes from player to player after a single selection. Continuing this game, Player Two selected the letter "R" which had one occurrence in the phrase. The server sends an appropriate message in the same manner as was done for the Player One selection of the letter "E" and the bonus game display is updated accordingly.

Figure 20:
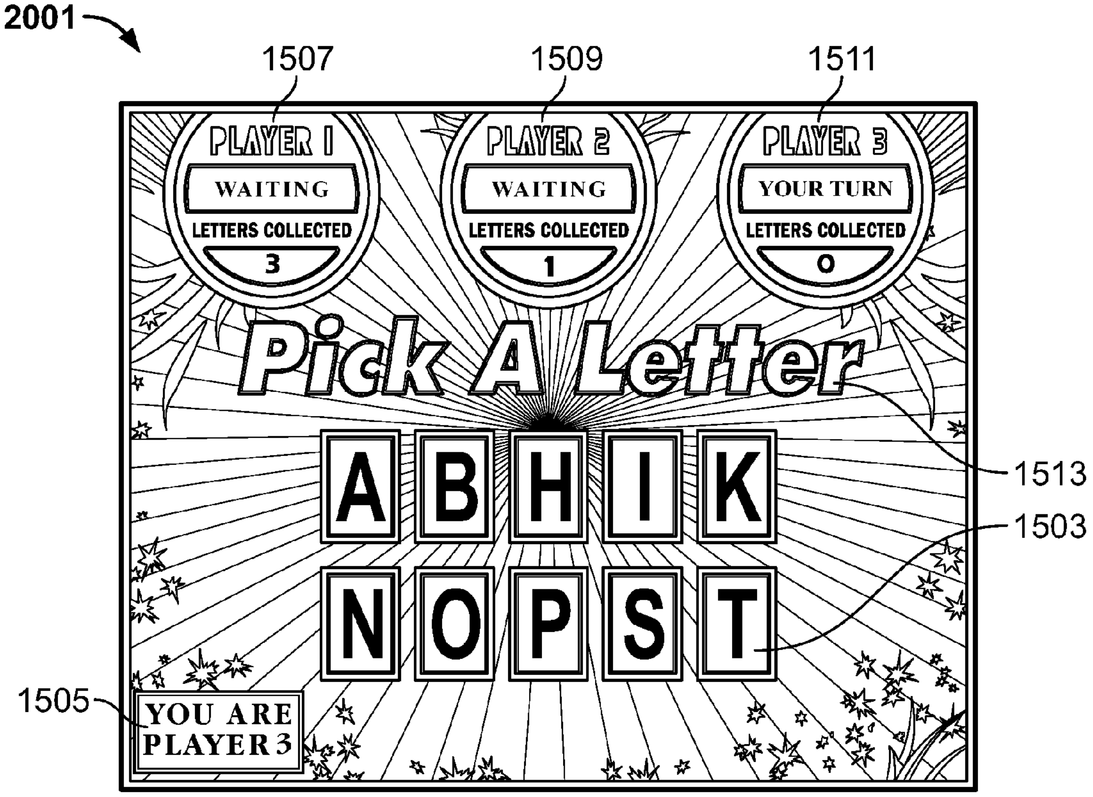
FIG. 20 is an illustrative screen showing an aspect of the "Hangman" community bonus game according to the present invention.

FIG. 20 shows the display 2001, including the identity indicator 1505, of the Player Three gaming machine at the end of the sequence described above. The display 2001 of the Player Three gaming machine shows the letters collected by Player One on the bonus sign 1507 and the letters collected by Player Two on the bonus sign 1509. The bonus game sign 1511 of Player Three shows that it is Player Three's turn. The remaining possible letters 1503 are all possible letters shown in FIG. 15 with the letter "E" removed (selected by Player One as described above) and the letter "R" removed (selected by Player Two as described above). In addition, the Player Two bonus sign 1509 and Player One bonus sign 1507 show "Waiting". The Player Three display 2001 shows the prompt area 1513 with "Pick a Letter" on the Player Three display 2001.

Figure 21:
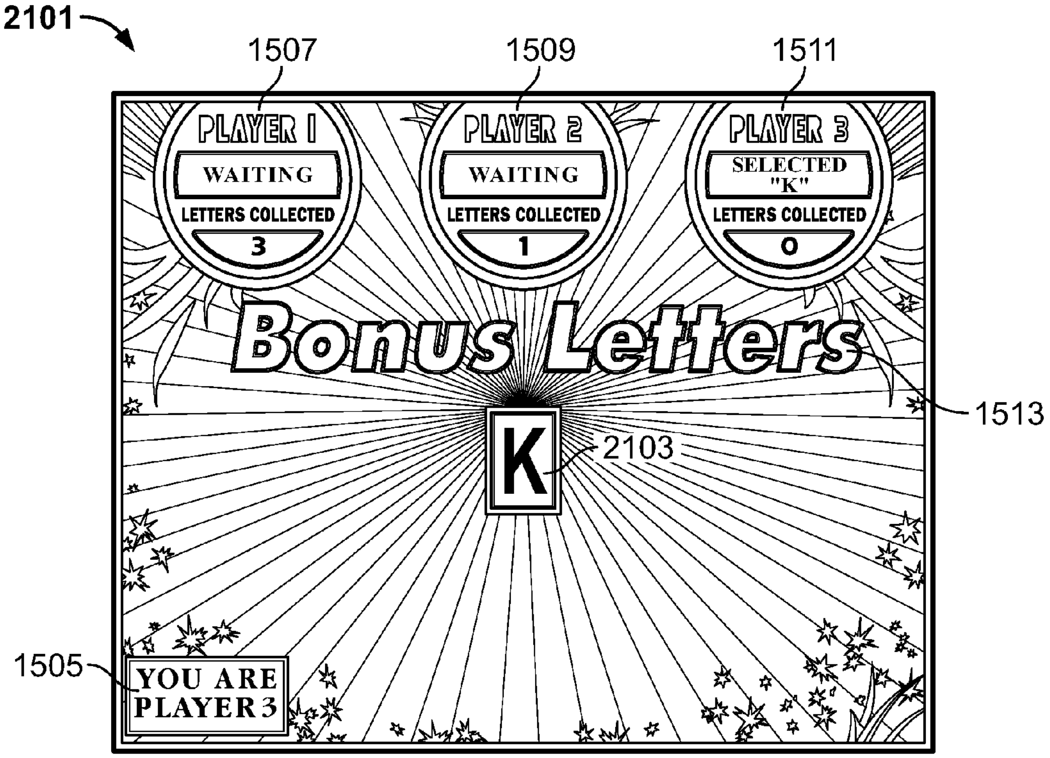
FIG. 21 is an illustrative screen showing an aspect of the "Hangman" community bonus game according to the present invention.

The play now moves to Player Three. In this example, Player Three touches the letter "K" on the touchscreen display. The gaming machine sends a message to the bonus game server indicating that the letter "K" was selected. FIG. 21 is an illustrative screen showing the display 2101 on Player Three's gaming machine after Player Three selected the letter "K". All letters are removed and the letter "K" 2103 is displayed. The Player Three bonus game sign 1511 shows letter "K" was selected. The bonus game server sends messages to the other participating gaming machines which cause the letter "K" to be removed from the possible letters from each individual gaming machine.

It is well known in the art to "hide" bonus features. For example, upon the selection of a letter, a bonus feature is revealed. Bonus features could include free picks, extra bonus credits or even the triggering of an additional bonus game. In this embodiment, when a letter is selected that only appears once in the phrase 1403, 1405, 1407, 1409 (FIG. 14), a bonus letter is given to the player and is communicated to the player by "Bonus Letters" illustrated on the prompt area 1513. Bonus letter selections are randomly assigned to the "once-appearing" letters such that not all "once-appearing" letters provide the player with a bonus letter. Every time a "once-appearing" letter is selected, the bonus game server selects a random number using a random number generator (RNG) as is well known in the art. Based on this random number, a Bonus Letter will be awarded 50% of the time. This embodiment injects some additional luck for the participating players through the selection of the letters as a partial offset to skill in playing the game. Additionally, this embodiment speeds up the game and adds some anticipation once the players all know the phrase and are selecting the final letters, which will be mostly "once-appearing" letters. As shown in FIG. 21, Player Three's selection of the letter "K" provided Player Three with a bonus letter to be selected by the computer.

Figure 22:
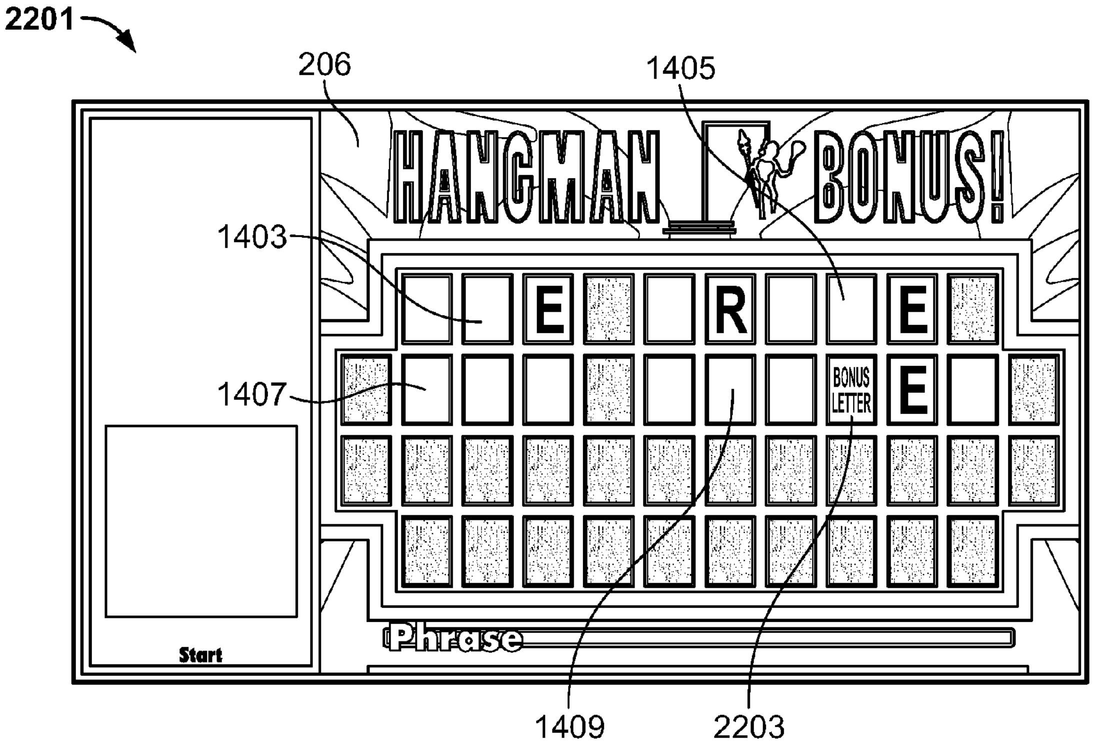
FIG. 22 is an illustrative screen showing an aspect of the "Hangman" community bonus game according to the present invention.

FIG. 22 is an illustrative screen 2201 showing the bonus game display 206 at the time of the selection of letter "K" by Player Three. A "Bonus Letter" prompt 2203 is briefly shown in the position where the letter "K" appears in the phrase 1409. Then the bonus game server updates the bonus game display 206 to show the letter "K" in the phrase. The bonus game server then randomly selects one of the remaining letters as the bonus letter. It sends a message to the Player Three gaming machine about the selected bonus letter. It also sends messages to the other participating individual bonus gaming machines about the letters that are being accumulated by Player Three.

As in some games, such as live poker, a weaker player may consistently lose everything. The bonus game of the present invention has been designed with a mixture of skill and luck. At the start of the bonus game, with no letters showing, a player can use skill to select letters that have a higher natural frequency in the language. In addition, there is an element of luck based on the randomly chosen phrase and whether the player's selection of a high frequency letter appears in the phrase. As described above, each turn of a player is guaranteed the selection of a letter in the bonus phrase along with the random awarding of bonus letters on "once-appearing" letters that are selected. The random awarding of bonus letters injects additional luck to balance skill and provide everyone with a share of the bonus award. While this is considered to be a preferred result, the balance between skill and/or luck could vary to design different types of games.

Figure 23:
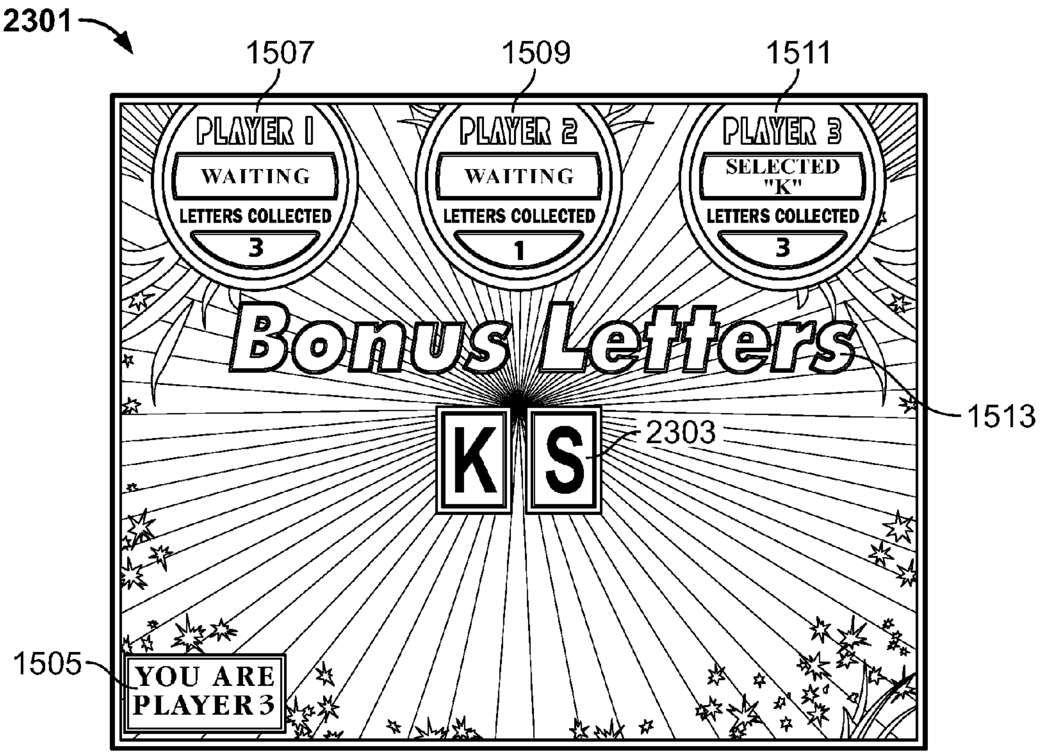
FIG. 23 is an illustrative screen showing an aspect of the "Hangman" community bonus game according to the present invention.

FIG. 23 is an illustrative screen showing the Player Three display 2301 after the bonus game server has selected the letter “S” as a bonus letter 2303. Player Three’s selection of the letter “K” 2103 as shown in FIG. 21, provided Player Three with a bonus letter “S” 2303 selected by the computer. The bonus game server sends messages to the other participating individual gaming machines that cause the letter “S” to be removed from the possible letters from each individual gaming machine. The display 2301 of the Player Three gaming machine shows the letters collected by Player One on the bonus sign 1507 and the letters collected by Player Two on the bonus sign 1509. The bonus game sign 1511 of Player Three shows that Player Three has selected the letter “K”, and that Player Three has three letters collected—one letter “K” and two bonus letters “S”.

Figure 24:
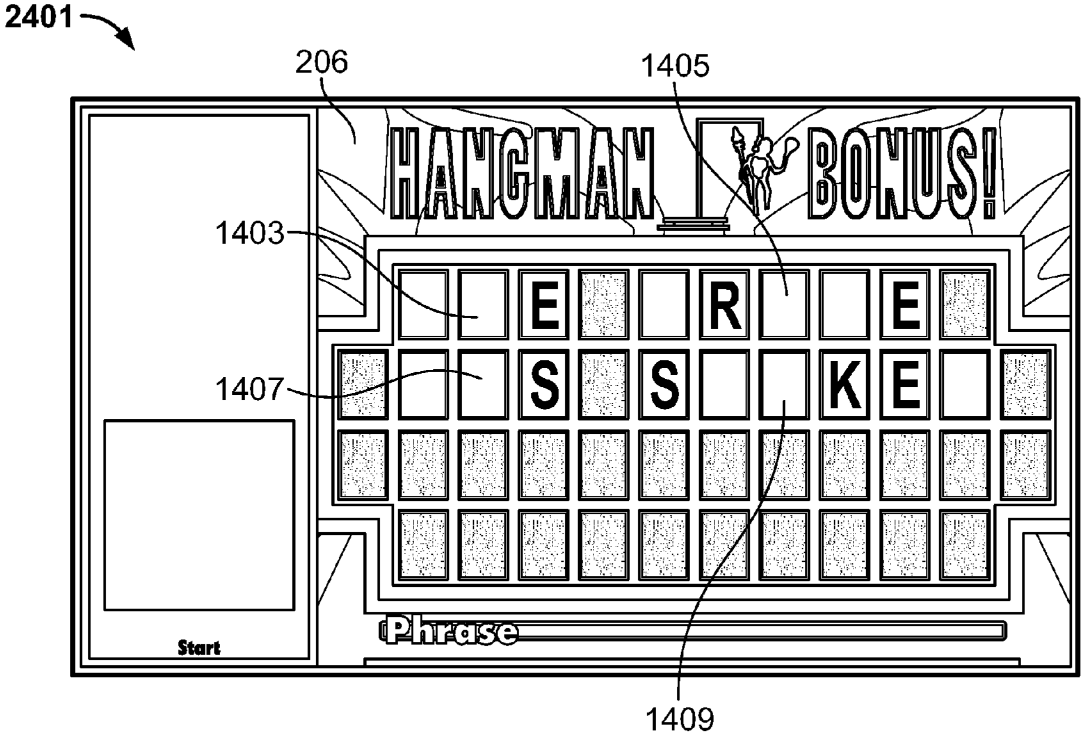
FIG. 24 is an illustrative screen showing an aspect of the "Hangman" community bonus game according to the present invention.

FIG. 24 is an illustrative screen showing the community bonus game display 206 at the end of Player Three’s turn described above. All selected letters appear in the phrase 1403, 1405, 1407, 1409. Play rotates back to Player One, but now Player One realizes that the solution to the phrase is “The Tribe Has Spoken”. Although in this embodiment the players do not have the option to solve the puzzle, that option is contemplated without departing from the invention. The option to solve the puzzle would make a player’s skill more valuable.

In this embodiment, the skill of selecting letters which are more likely to occur (such as vowels and frequently used consonants like “S” and “T” for English phrases) allows the player to select the letters that have the best chance of multiple occurrences, thus allocating more money to the bonus game award. The player that uses skill to tally up more letters does this at the expense of the other participating players in the bonus game. The game operator supplies a bonus game award that is proportional to the number of letters in the phrase. This award is divided up among the participating players based on their performance in the bonus game.

With the realization that the solution is “The Tribe has Spoken”, Player One quickly determines the remaining letter distribution as:

| | |
|---|---|
| T | 2 letters |
| H | 2 letters |
| I | 1 letter |
| B | 1 letter |
| A | 1 letter |
| P | 1 letter |
| O | 1 letter |
| N | 1 letter |

Figure 25:
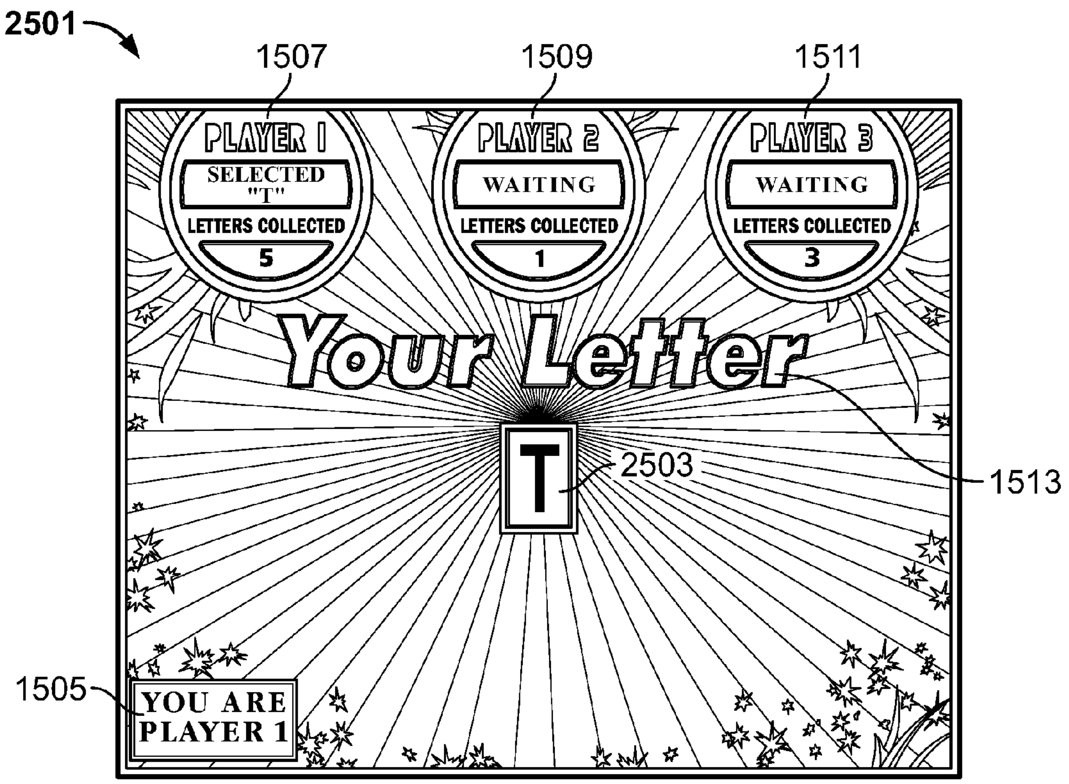
FIG. 25 is an illustrative screen showing an aspect of the "Hangman" community bonus game according to the present invention.

FIG. 25 is an illustrative screen showing the community bonus game display 2501 after Player One selected the letter “T”. After Player One’s selection of the letter “T”, which has two occurrences, the Player One bonus sign 1507 reflects five “letters collected”. The same type of server/game communication continues with each selection to allow the bonus game display and the display of each participating gaming machine to display the updated information.

Player Two selects the letter “I”, which is a “once-appearing” letter, and is awarded the bonus letter “B” as described above in reference to FIG. 21. Player Three selects the letter “O”. It comes around to Player One again, who selects the letter “H” for another two letters.

Figure 26:
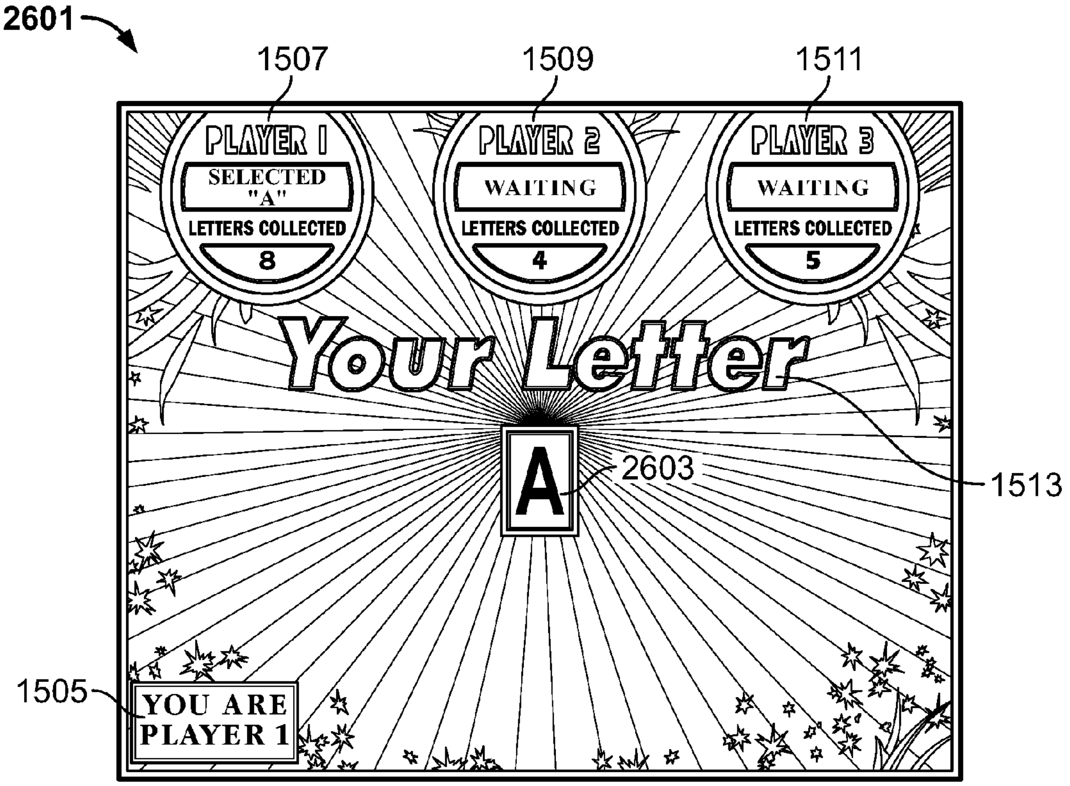
FIG. 26 is an illustrative screen showing an aspect of the "Hangman" community bonus game according to the present invention.

The participating players select the last three letters of the phrase. FIG. 26 is an illustrative screen showing the display 2601 of Player One after the final letter is selected. The bonus game sign 1507 of Player One shows eight “letters collected” while the Player Two bonus game sign 1509 shows four “letters collected” and the bonus sign 1511 of Player Three shows five “letters collected”. With a combination of skill and luck, Player One got most of the seventeen letters in the puzzle.

Figure 27:
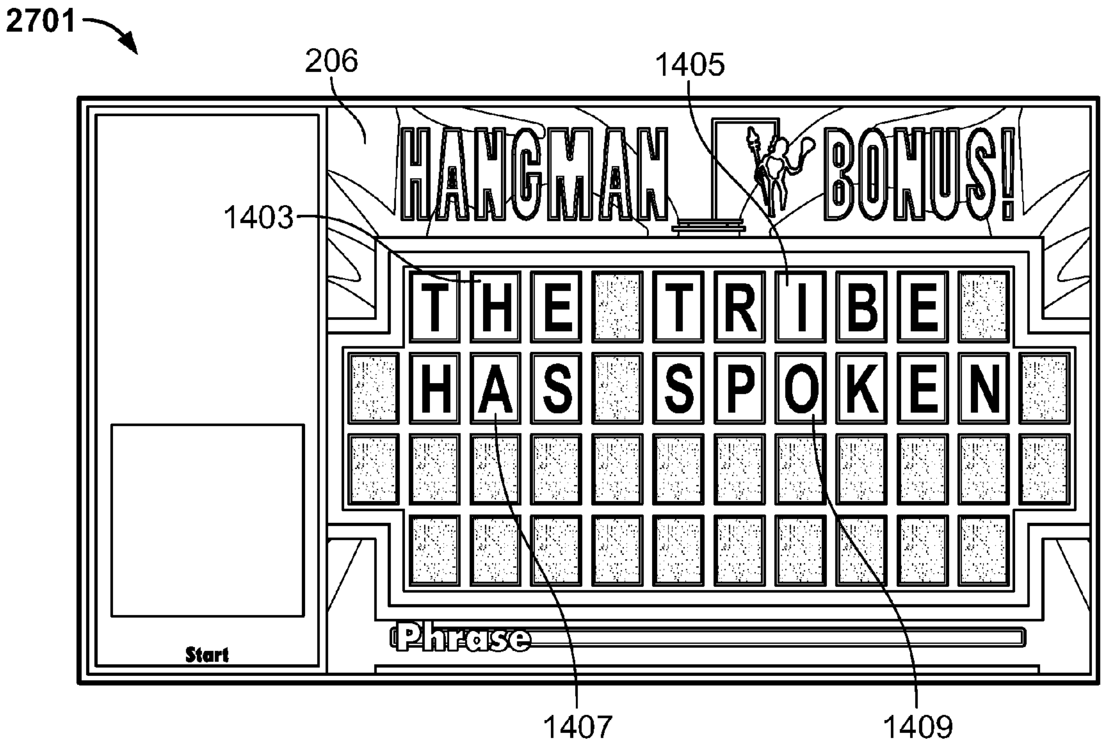
FIG. 27 is an illustrative screen showing an aspect of the "Hangman" community bonus game according to the present invention.

FIG. 27 shows the final community bonus game display 206 with the first word 1403 solved as “the”, the second word 1405 solved as “tribe”, the third word 1407 solved as “has” and the fourth word 1409 solved as “spoken”.

At the end of the game there is an award to each player for the letters that they have collected. In this embodiment, after the participating players have selected all of the letters in the phrase, the bonus game server causes the mechanical bonus game wheel 1303 (FIG. 13) to spin and stop on a value. Each player receives this value in terms of number of credits for each letter they collected from the bonus game phrase. In this example, if the bonus game wheel stopped on “one hundred”, then each player would receive one hundred credits for each letter collected. For example, in reference to FIG. 26, Player One would receive eight hundred credits, Player Two would receive four hundred credits, and Player Three would receive five hundred credits.

The bonus game wheel 1303 (FIG. 13) is controlled by a stepper motor, or by any controller well known in the art. The bonus game CPU uses its RNG to determine the value and then the wheel spins to stop on that value. In this embodiment, the values on the bonus game wheel do not have equal probability of being stopped upon. A weight or probability is assigned to each value on the bonus game wheel, which will result in certain values occurring more often while other values occur less often. The EV of a bonus game wheel spin is therefore the sum of the products of the probability (weight) and each possible value, as is well known in the art. It is further contemplated that a bonus game wheel with equal weighted values may be used and the EV of a bonus game wheel spin is the average of all possible values.

The expected value of the bonus award needs to be known when developing the math model for the base game. The EV of the bonus game can be expressed as:

EV(Bonus)=<average # of letters in phrases>*<EV of Wheel Spin>/<# of players in Bonus>

This is the expected value that will be awarded per bonus game over the long run. Because the game distributes three times the bonus game EV for every three qualifications, the introduction of skill does not affect the average expected return of the group of individual gaming machines as the players divide the “pot” during each play of the bonus game. With regards to the credit “pool” or “pot” or “redistributed payout” that is being divided among the participants, it is helpful to look at this a little bit more closely. In a traditional “pot” game such as live poker, a fixed pot of money is created by the players as they place their bets. In live poker, this pot is divided up among the players (less any rake by the casino) based on the results of the poker hand. In the present invention, the EV (shown above) is figured into the overall payout of the game as is well known in the art.

The present invention introduces two concepts that alter the concept of a “pot” from a fixed amount of money to amounts that are affected by the relative size of the wagers and the volatility of the bonus game itself. The first concept is an adjustment for different sized wagers. In this embodiment, it is done by multiplying the final amount won by the “bet per line" value as is well known in the art. Each player is competing for their share of the base value and then this result is scaled by the size of their bet. The second concept is the EV of the bonus game. In this embodiment the EV is based on the average number of letters in the phrase as well as the weighted average of the numbers on the bonus game wheel. It is well known in the art that these averages may be used in the calculation for the return of each gaming machine, however each bonus game result may be much higher or lower than the calculated EV. In each bonus game, given the number of letters in the randomly selected phrase and the resulting value on the wheel, the players are competing to divide up the base units of this pool.

Once the bonus game wheel is spun and a value has been determined, the bonus game server sends a message to each gaming machine indicating the wheel value. At this point, each participating gaming machine displays a summary screen showing the number of letters collected, the value per letter (determined by the bonus wheel spin) and the total bonus earned. This amount is added to the bonus game sign for each player and the gaming machine reverts back to operation of the base game.

Immediately after completion of the bonus game, the bonus game server checks to see if there are enough queued qualifications to begin a new bonus game. If there are enough queued qualifications, the bonus game server begins the process again with messages to each qualified gaming machine that a bonus game is about to begin. If there are not enough queued qualifications then the bonus game server begins an "idle" program on the bonus game display, which could include advertising, simulated bonus games or information about the game. The "idle" program is operated while waiting for the minimum number of qualifications required for the next bonus game.

While the present invention has been described with reference to particular embodiments, those skilled in the art will recognize that many changes may be made thereto without departing from the scope of the present invention. Each of these embodiments and variants thereof is contemplated as falling with the scope of the claimed invention, as set forth in the following claims.

We claim:

1. A method for operating an interactive game on a plurality of linked gaming machines, comprising the steps of:

entering a wager by a participating player;

providing a base game playable on each of a plurality of gaming machines by at least two respective players;

providing a community bonus game playable in common from each gaming machine in the plurality of gaming machines, said bonus game including a set of a plurality of game elements for a game, wherein said set of game elements yield letters comprising at least one word hidden from view of at least first and second players comprising said at least two respective players;

operating said base and bonus games using at least one processor including data storage containing program instructions executable by said at least one processor for carrying out a set of functions, said set of functions including:

engaging at least two gaming machines of said plurality of gaming machines in play of said community bonus game among said at least two players, said play of said community bonus game resulting in respective bonus-game outcomes for said at least two players;

receiving, during play of said community bonus game, input from said at least two players via the at least two gaming machines, said input reflecting choices made by said at least two players during play of said community bonus game, said choices affecting said respective bonus-game outcomes in a manner that has the potential of yielding different respective bonus-game outcomes as between said at least two players, said input including alternate play of said community bonus game by said at least two players who comprise said first and second players, wherein said first player and said second player alternately select a letter from a set of letters visible to said first and second players before player selection thereof, said set of letters comprising the letters of said at least one word but less than all of the letters of the alphabet, and wherein a selected letter is revealed in said set of game elements;

calculating a respective award for each of said at least two players based at least in part on said game element letters revealed in said set of game elements by each of said at least two players; and presenting said award to said at least one player.

2. The method for operating an interactive game on a plurality of linked gaming machines of claim 1 wherein said players receive a point for each game element revealed.

3. The method for operating an interactive game on a plurality of linked gaming machines of claim 1 wherein said letters for selection are each in said at least one word hidden from view.

4. The method for operating an interactive game on a plurality of linked gaming machines of claim 1 wherein said letters of game elements present in said at least one word hidden from view are worth a predetermined value.

5. The method for operating an interactive game on a plurality of linked gaming machines of claim 1 further comprising solving said set of game elements to a conclusion by revealing said at least one word.

6. The method for operating an interactive game on a plurality of linked gaming machines of claim 5 wherein solving said at least one word occurs prior to all said game element letters being revealed.

7. The method for operating an interactive game on a plurality of linked gaming machines of claim 1 further comprising spinning a wheel construct populated with a plurality of predetermined award indicia to a point where said wheel construct stops upon an award indicium.

8. The method for operating an interactive game on a plurality of linked gaming machines of claim 7 wherein said wheel construct is generated electronically on a display.

9. The method for operating an interactive game on a plurality of linked gaming machines of claim 7 wherein said wheel construct is a mechanical device which physically spins on an axis.

10. The method for operating an interactive game on a plurality of linked gaming machines of claim 1 wherein said award is calculated by multiplying a total value received by a player for each game element letter revealed by said player with said award indicium for a payout.

11. The method for operating an interactive game on a plurality of linked gaming machines of claim 1 further comprising providing said players with a choice of only letters in said at least one word.

12. The method for operating an interactive game on a plurality of linked gaming machines of claim 1 further comprising the ability for a player to enter an additional wager during play of said game.

13. The method for operating an interactive game on a plurality of linked gaming machines of claim 1 wherein one of said players is a computer.

14. The method for operating an interactive game on a plurality of linked gaming machines of claim 1 wherein each player who is a human being receives a payout.

15. A method for operating a gaming system comprising:

providing a base game playable on each of a plurality of gaming machines by at least two respective players;

providing a community bonus game playable in common from each gaming machine in the plurality of gaming machines, said bonus game including a set of a plurality of game elements for a game, wherein said set of game elements yield letters comprising at least one word hidden from view of at least first and second players comprising said at least two players;

operating said base and bonus games using at least one processor including data storage containing program instructions executable by said at least one processor for carrying out a set of functions, said set of functions including:

engaging at least two gaming machines among the plurality of gaming machines in play of said community bonus game among said at least two players, said play of said community bonus game resulting in respective bonus-game outcomes for said at least two players;

receiving, during play of said community bonus game, input from said at least two players via said at least two gaming machines, said input reflecting choices made by said at least two players during play of said community bonus game, said choices affecting said respective bonus-game outcomes in a manner that has the potential of yielding different respective bonus-game outcomes as between said at least two players, said input including alternate play of said community bonus game by said at least two players who comprise said first and second players, wherein said first player and said second player select from a set of letters visible to said first and second players before player selection thereof, said set of letters comprising letters of said at least one word but less than all of the letters of the alphabet, and wherein a selected letter is revealed in said set of game elements; and calculating a respective bonus-game payout, if any, for each of said at least two players based at least in part on said respective bonus-game outcomes of said at least two players.

16. The method for operating a gaming system of claim 15, wherein said set of letters consists of the letters of said at least one word.

17. The method for operating a gaming system of claim 15, wherein said set of letters is only the letters of said at least one word.

18. The method for operating a gaming system of claim 15, wherein a bonus award is further associated with one or more letters of said set.

19. The method for operating a gaming system of claim 18, wherein said bonus award is the pick of another letter of said set of letters.

20. The method for operating a gaming system of claim 19, wherein said bonus letter pick is selected by said program instructions.

21. A method for operating a gaming system comprising:

providing a base game playable on each of a plurality of gaming machines;

providing a community bonus game playable in common from each gaming machine in the plurality of gaming machines, said bonus game including a set of game elements in the form of alphabetic letters comprising at least one word hidden from view of at least first and second players;

operating said base and bonus games using at least one processor and data storage containing program instructions executable by the at least one processor for carrying out a set of functions, the set including:

engaging at least two gaming machines among the plurality of gaming machines in play of said community bonus game among at least two players, said play of said community bonus game resulting in respective bonus-game outcomes for said at least first and second players;

receiving, during said play of said community bonus game, input from said at least first and second players via the at least two gaming machines, said input affecting said respective bonus-game outcomes in a manner that has the potential of yielding different respective bonus-game outcomes as between at least said first and second players, wherein receiving said input comprises receiving said input as said players take alternating turns during said play of said community bonus game wherein said at least first player and said second player each alternately select one letter from a set of letters visible to said first and second players before player selection thereof, said set of letters comprising the letters of said at least one word but less than all of the letters of the alphabet, and wherein a selected letter is revealed in said set of game elements, and further including a bonus award associated with one or more letters of said set of letters, wherein said bonus award is a pick of another letter of said set of letters; and calculating a respective bonus-game payout, if any, for each of said at least first and second players based at least in part on said respective bonus-game outcomes of the at least two players.

22. The method for operating a gaming system of claim 21, wherein said bonus letter pick is selected by said program instructions.

* * * * *